US 9,694,790 B2

(12) United States Patent
Kimener

(10) Patent No.: US 9,694,790 B2
(45) Date of Patent: Jul. 4, 2017

(54) TRAILER DOCKING REPOSITIONABLE SUPPORT

(71) Applicant: STAbilock LLC, Loveland, OH (US)

(72) Inventor: Robert Peter Kimener, Loveland, OH (US)

( * ) Notice: Subject to any disclaimer, the term of this patent is extended or adjusted under 35 U.S.C. 154(b) by 0 days.

(21) Appl. No.: 13/957,097

(22) Filed: Aug. 1, 2013

(65) Prior Publication Data
US 2014/0159342 A1    Jun. 12, 2014

Related U.S. Application Data

(63) Continuation of application No. 13/010,462, filed on Jan. 20, 2011, now Pat. No. 8,528,929.
(Continued)

(51) Int. Cl.
*B60S 9/16* (2006.01)
*B65G 69/00* (2006.01)
(Continued)

(52) U.S. Cl.
CPC .............. *B60S 9/16* (2013.01); *B60D 1/665* (2013.01); *B62D 53/0864* (2013.01); *B65G 69/003* (2013.01)

(58) Field of Classification Search
CPC ....... B60S 9/19; B60D 1/665; B62D 53/0864; B65G 69/003
USPC ...... 280/476.1, 762, 763.1, 400, 406.2, 475, 280/432, 423.1, 79.4, 23.24; 414/333, 59, 414/340, 786, 339, 341, 343, 345, 58, 60, 414/61, 62, 63, 64
See application file for complete search history.

(56) References Cited

U.S. PATENT DOCUMENTS 306,581 A    10/1884  Chase
522,993 A     7/1894  Lobee
(Continued)

FOREIGN PATENT DOCUMENTS

CA    1197500    12/1985
DE     653079    11/1937
(Continued)

*Primary Examiner* — Jacob Knutson
(74) *Attorney, Agent, or Firm* — Willis IP; Ryan Willis

(57) ABSTRACT

A trailer stabilizing device for stabilizing a parked freight trailer comprising a frame having mounted thereto at least a right side wheel and a left side wheel, the frame also including a hitch, a fifth wheel, and at least one of a repositionable wheel chock and a repositionable hook, the trailer stabilizing device further including a repositioning device in order to reposition at least one of the repositionable wheel chock and the repositionable hook. The present disclosure also includes a method of stabilizing a parked trailer at a loading dock, the method comprising: (a) positioning a wheeled trailer stabilizer underneath a parked freight trailer at a loading dock while landing gear of the parked freight trailer are deployed and a kingpin of the parked trailer is accessible; (b) securing the kingpin of the parked freight trailer to a fifth wheel of the wheeled trailer stabilizer; and, (c) deploying a repositionable hook operatively coupled to the frame of the wheeled trailer stabilizer so the repositionable hook couples to a cleat mounted to the ground, where deployment of the hook is operative to exert a pulling force on the kingpin.

36 Claims, 13 Drawing Sheets

Related U.S. Application Data

(60) Provisional application No. 61/296,995, filed on Jan. 21, 2010, provisional application No. 61/346,143, filed on May 19, 2010.

(51) Int. Cl.
*B62D 53/08* (2006.01)
*B60D 1/66* (2006.01)

(56) References Cited

U.S. PATENT DOCUMENTS

| | | |
|---|---|---|
| 1,368,854 A | 2/1921 | Steele |
| 1,786,463 A | 12/1930 | Thomas |
| 2,621,942 A | 12/1952 | Getz |
| 2,754,108 A | 7/1956 | Brown |
| 2,766,007 A | 10/1956 | Krilanovich |
| 2,841,247 A | 7/1958 | Smalley |
| 2,916,238 A | 12/1959 | Fahland |
| 3,016,025 A | 1/1962 | Deodat |
| 3,086,619 A | 4/1963 | Grotz |
| 3,150,729 A | 9/1964 | Mehki |
| 3,169,012 A | 2/1965 | Fagan |
| 3,183,854 A | 5/1965 | Candlin, Jr. et al. |
| 3,189,322 A | 6/1965 | Hadek |
| 3,234,893 A | 2/1966 | Sweda |
| 3,235,211 A | 2/1966 | Robinson et al. |
| 3,250,506 A | 5/1966 | Thouvenelle et al. |
| 3,254,900 A | 6/1966 | Lee |
| 3,291,234 A | 12/1966 | Woodburn |
| 3,305,049 A | 2/1967 | Willey |
| 3,348,502 A | 10/1967 | Bums et al. |
| 3,362,353 A | 1/1968 | Johnson et al. |
| 3,392,944 A | 7/1968 | Wyrough |
| 3,403,487 A | 10/1968 | Docter |
| 3,486,768 A | 12/1969 | Masser |
| 3,504,880 A | 4/1970 | Toms |
| 3,521,902 A | 7/1970 | Akers |
| 3,523,698 A | 8/1970 | Bishop |
| 3,542,157 A | 11/1970 | Noah |
| 3,556,481 A | 1/1971 | Mueller et al. |
| 3,589,748 A | 6/1971 | Miller |
| 3,625,531 A | 12/1971 | Ranzenhofer |
| 3,657,695 A | 4/1972 | Birmingham |
| 3,669,409 A | 6/1972 | Eranosian |
| 3,693,145 A | 9/1972 | Mize |
| 3,698,730 A | 10/1972 | Hansen |
| 3,787,030 A | 1/1974 | Bieker |
| 3,793,787 A | 2/1974 | Shidaker et al. |
| 3,824,536 A | 7/1974 | Cherico |
| 3,836,179 A | 9/1974 | Jennings |
| 3,949,822 A | 4/1976 | English |
| 3,950,811 A | 4/1976 | Larson |
| 3,995,876 A | 12/1976 | Ronne |
| 3,999,427 A | 12/1976 | Decker |
| 4,002,215 A | 1/1977 | Harvill |
| 4,023,649 A | 5/1977 | Wood |
| 4,037,822 A | 7/1977 | Barcella |
| 4,067,543 A | 1/1978 | Orth et al. |
| 4,097,840 A | 6/1978 | Chappelle |
| 4,099,695 A | 7/1978 | Shinn, Jr. |
| 4,102,172 A | 7/1978 | Iiyoshi |
| 4,113,065 A | 9/1978 | Sikli |
| 4,127,856 A | 11/1978 | Bickel |
| 4,199,168 A | 4/1980 | Bush et al. |
| 4,223,767 A | 9/1980 | Powell |
| 4,254,532 A | 3/1981 | Hager |
| 4,255,120 A * | 3/1981 | Straitz, III .................. 431/202 |
| 4,261,682 A | 4/1981 | Papps et al. |
| 4,354,580 A | 10/1982 | Delasantos et al. |
| 4,366,965 A | 1/1983 | Rhodes |
| 4,397,594 A | 8/1983 | Hammonds et al. |
| 4,452,147 A | 6/1984 | Jwuc |
| 4,456,084 A | 6/1984 | Miller |
| 4,456,278 A | 6/1984 | Chapman |
| 4,456,413 A | 6/1984 | Pavlick |
| 4,462,569 A | 7/1984 | Arzouman |
| 4,524,699 A | 6/1985 | Pavlick |
| 4,547,107 A | 10/1985 | Krause |
| 4,573,663 A | 3/1986 | Nussbaum |
| 4,582,176 A | 4/1986 | Roberts |
| 4,636,119 A | 1/1987 | Terlecky |
| 4,671,714 A | 6/1987 | Bennett |
| 4,674,929 A | 6/1987 | Blunden |
| 4,676,344 A | 6/1987 | Locicero |
| 4,712,653 A | 12/1987 | Franklin et al. |
| 4,718,800 A | 1/1988 | Engle |
| 4,724,930 A | 2/1988 | Vanlierop |
| 4,743,150 A | 5/1988 | Hlinsky |
| 4,822,004 A | 4/1989 | Van Lierop |
| 4,830,563 A | 5/1989 | Yeakle |
| 4,858,888 A | 8/1989 | Cruz et al. |
| 4,865,295 A | 9/1989 | Holloway |
| 4,874,184 A | 10/1989 | Boyer |
| 4,921,074 A | 5/1990 | Ochs |
| 4,938,648 A | 7/1990 | Horan |
| 4,969,112 A | 11/1990 | Castle |
| 4,973,206 A | 11/1990 | Engle |
| 5,013,011 A | 5/1991 | Halloway |
| 5,015,131 A | 5/1991 | Schmidt et al. |
| 5,017,064 A | 5/1991 | Kirwan et al. |
| 5,017,065 A | 5/1991 | Krug et al. |
| 5,020,445 A | 6/1991 | Adams, Jr. |
| 5,026,229 A | 6/1991 | Matyas et al. |
| 5,048,896 A | 9/1991 | Channell |
| 5,052,868 A | 10/1991 | Hesch et al. |
| 5,059,072 A | 10/1991 | Holt |
| 5,090,720 A | 2/1992 | Heider et al. |
| 5,100,105 A | 3/1992 | Schneider et al. |
| 5,107,772 A | 4/1992 | Viens |
| 5,112,172 A | 5/1992 | Engle |
| 5,118,082 A | 6/1992 | Byan |
| 5,137,297 A | 8/1992 | Walker |
| 5,139,102 A | 8/1992 | Pocapalia |
| 5,215,344 A | 6/1993 | Augustyniak |
| 5,224,311 A | 7/1993 | Pearce |
| 5,249,905 A | 10/1993 | Warner et al. |
| 5,291,835 A | 3/1994 | Wicks |
| 5,305,496 A | 4/1994 | Gagnon |
| 5,322,143 A | 6/1994 | Curran |
| 5,340,082 A | 8/1994 | Holloway |
| 5,348,331 A | 9/1994 | Hawkins |
| 5,407,221 A * | 4/1995 | Haire et al. ................ 280/476.1 |
| 5,407,309 A | 4/1995 | Hesch et al. |
| 5,433,578 A | 7/1995 | Honan |
| 5,452,982 A * | 9/1995 | Engle ........................ 414/333 |
| 5,490,748 A | 2/1996 | Hapeman |
| 5,518,354 A | 5/1996 | Engle |
| 5,531,559 A | 7/1996 | Kruzick |
| 5,553,987 A | 9/1996 | Ellis |
| 5,575,604 A * | 11/1996 | Dubosh et al. ............. 414/462 |
| 5,582,498 A | 12/1996 | Springer et al. |
| 5,662,450 A | 9/1997 | Roberts |
| 5,709,518 A | 1/1998 | Alexander et al. |
| 5,743,697 A | 4/1998 | Alexander |
| 5,757,528 A | 5/1998 | Bradley et al. |
| 5,762,459 A | 6/1998 | Springer et al. |
| 5,808,769 A | 9/1998 | Kerklaan et al. |
| 5,868,378 A | 2/1999 | Ellis |
| 5,934,857 A | 8/1999 | Alexander |
| 6,082,952 A | 7/2000 | Alexander |
| 6,089,544 A | 7/2000 | Ellis |
| 6,091,764 A | 7/2000 | Silk et al. |
| 6,092,970 A | 7/2000 | Hahn et al. |
| 6,144,888 A | 11/2000 | Lucas et al. |
| 6,168,360 B1 | 1/2001 | Knox |
| 6,250,432 B1 | 6/2001 | Hageman et al. |
| 6,250,650 B1 | 6/2001 | Douglas |
| 6,309,165 B1 | 10/2001 | Hahn et al. |
| 6,318,947 B1 | 11/2001 | Hahn et al. |
| 6,336,527 B1 | 1/2002 | Metz |
| 6,357,987 B1 | 3/2002 | Palus |
| 6,368,043 B1 | 4/2002 | Leum et al. |
| 6,396,408 B2 | 5/2002 | Drummond et al. |
| 6,481,739 B1 | 11/2002 | Newkirk |

(56) References Cited

U.S. PATENT DOCUMENTS

| | | |
|---|---|---|
| 6,505,713 B1 | 1/2003 | Paul et al. |
| 6,520,472 B1 | 2/2003 | Manich et al. |
| 6,524,053 B2 | 2/2003 | Hahn et al. |
| 6,589,003 B2 | 7/2003 | Berends |
| 6,739,611 B2 | 5/2004 | Gisinger et al. |
| 6,755,433 B2 | 6/2004 | Krauss |
| 6,773,221 B2 | 8/2004 | Belongia et al. |
| 6,896,289 B2 | 5/2005 | Gross |
| 6,948,587 B2 | 9/2005 | Griffiths |
| 6,951,345 B2 | 10/2005 | Wilks |
| 7,226,265 B2 | 6/2007 | Wilson |
| 7,232,282 B2 | 6/2007 | Engle |
| 7,235,896 B2 | 6/2007 | Olijnyk |
| 7,264,092 B2 | 9/2007 | Jette |
| 7,270,201 B1 | 9/2007 | Cryer |
| 7,413,172 B2 | 8/2008 | Kanzler et al. |
| 8,286,997 B2 | 10/2012 | Kimener et al. |
| 8,528,929 B2 | 9/2013 | Kimener |
| 8,567,820 B2 | 10/2013 | Kimener |
| 8,789,850 B2 | 7/2014 | Kimener |
| 9,221,630 B2 | 12/2015 | Kimener |
| 2001/0022731 A1 | 9/2001 | Dupay |
| 2005/0133315 A1 | 6/2005 | Hoofard |
| 2006/0082100 A1 | 4/2006 | Gross et al. |
| 2006/0145460 A1 | 7/2006 | Eriksson |
| 2007/0040353 A1 | 2/2007 | Dallaire et al. |
| 2007/0050999 A1 | 3/2007 | Milner et al. |
| 2007/0252358 A1* | 11/2007 | Cunefare et al. ............ 280/432 |
| 2007/0290482 A1 | 12/2007 | Schak |
| 2008/0095598 A1 | 4/2008 | Cotton et al. |
| 2009/0283999 A1 | 11/2009 | Andersen et al. |
| 2010/0266375 A1 | 10/2010 | Ion |
| 2011/0158778 A1* | 6/2011 | Harrington ................. 414/401 |

FOREIGN PATENT DOCUMENTS

| | | |
|---|---|---|
| DE | 653079 C | 11/1937 |
| DE | 3425498 | 3/1985 |
| EP | 0510372 | 3/1992 |
| EP | 0510372 | 10/1994 |
| EP | 0510467 | 11/1994 |
| FR | 1334344 | 8/1963 |
| FR | 2636717 | 3/1990 |
| GB | 927806 | 6/1963 |
| GB | 2237329 | 5/1991 |
| WO | 9009339 | 8/1990 |
| WO | PCT/US2011/037260 | 10/2011 |
| WO | WO2011/146787 | 11/2011 |
| WO | PCT/US2011/037260 | 11/2012 |

* cited by examiner

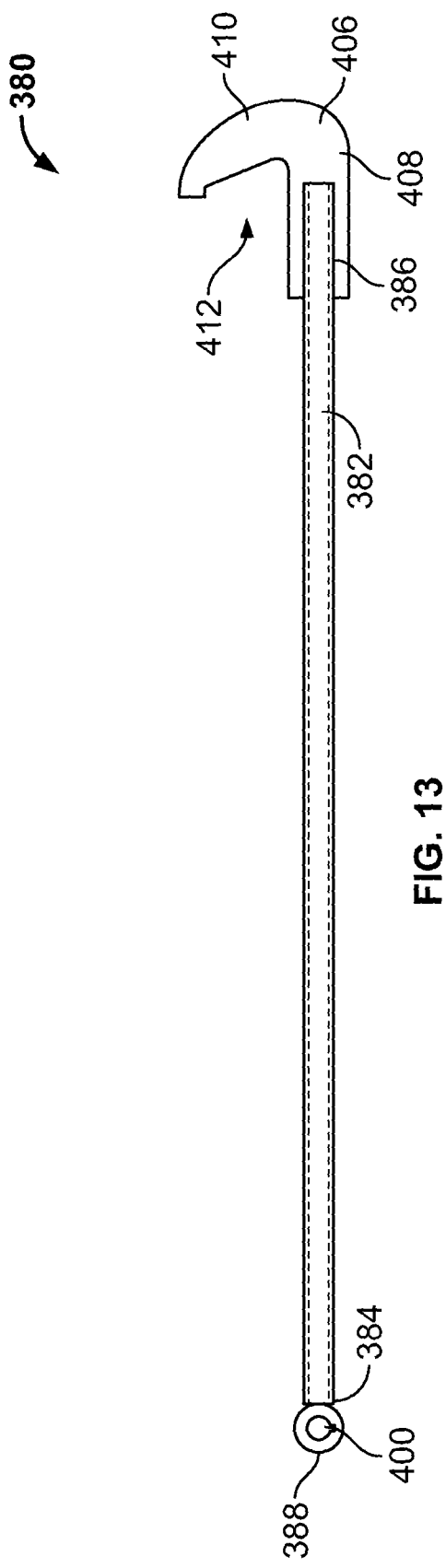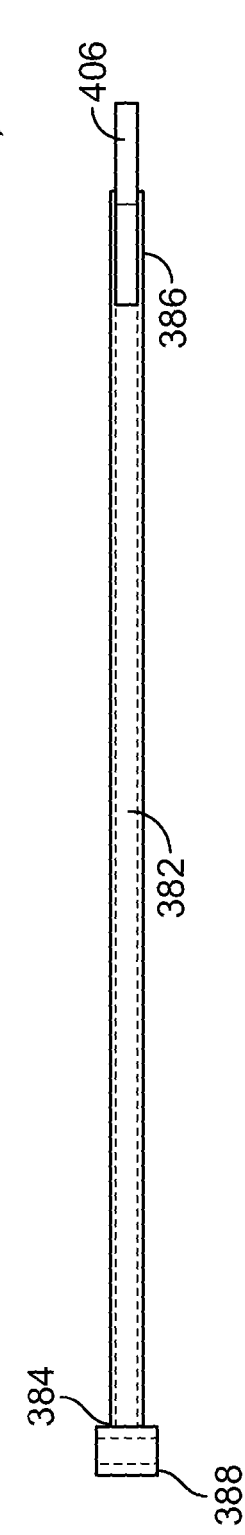

TRAILER DOCKING REPOSITIONABLE SUPPORT

CROSS REFERENCE TO RELATED APPLICATIONS

This application is a continuation of U.S. patent application Ser. No. 13/010,462, filed Jan. 20, 2011, now U.S. Pat. No. 8,528,929, titled "TRAILER DOCKING REPOSITIONABLE SUPPORT," which claimed the benefit of U.S. Provisional Patent Application Ser. No. 61/296,995, filed Jan. 21, 2010, titled "TRAILER DOCKING REPOSITIONABLE SUPPORT," and also claimed the benefit of U.S. Provisional Patent Application Ser. No. 61/346,143, filed May 19, 2010, titled "TRAILER DOCKING REPOSITIONABLE SUPPORT, " the disclosure of each of which is incorporated herein by reference.

RELATED ART

Field of the Invention

The present disclosure is directed to supports utilized to secure freight trailers at a loading dock while dock personnel load and/or unload cargo from the freight trailers.

Related Art of Interest

Distribution warehouses are a necessary component of commerce in the twenty-first century. These warehouses may act as a clearinghouse for shipments from various product suppliers and centralize the distribution of goods. Large chain retailers utilize warehouses to generate shipments to particular points of sale that are specific to the needs of consumers in that area, without requiring the original manufacturer of the goods to identify consumer demand at each point of sale and correspondingly deliver the particular goods to each point of sale.

An exemplary distribution warehouse generally includes fifteen or more loading docks, with each loading dock adapted to receive a single freight trailer of a semi truck. A loading dock typically includes an opening elevated above ground level to match the height of the floor of the freight trailer. The relatively equal height between the floor of the loading dock and the floor of the trailer enables lift trucks (i.e., forklifts) and other material handling devices to move freely back and forth between the warehouse and interior of the freight trailer.

In an exemplary sequence, a loading dock opening of a warehouse is initially unoccupied by a freight trailer. Thereafter, a semi trailer driver or yard truck driver backs the rear opening of a freight trailer into alignment with the opening of the dock. After the rear of the freight trailer is properly aligned and positioned adjacent to the dock opening, the driver will either continue the engagement between the truck and trailer, or discontinue the engagement and relocate the truck to a remote location. In the context of yard trucks, the yard truck is only connected to the freight trailers long enough to position it adjacent to the loading dock opening. In an exemplary day, the yard truck may connect to and disconnect from one hundred or more freight trailers.

In summary fashion, a yard truck is a dedicated tractor that stays at the warehouse location and is only used to reposition freight trailers (not to tow the trailers on the open highways). By way of example, a warehouse may have ten dock openings, but have fifty trailers waiting to be unloaded. In order to expedite freight unloading and loading, as well as the convenience of the semi truck drivers that deliver to or pick up the freight trailers from the warehouse, the freight trailers need to be shuffled. This means that freight trailers do not include dedicated semi tractors continuously connected to them. Instead, because no semi truck is connected to many, if not all, of the freight trailers at a warehouse location, a yard truck is necessary to reposition the freight trailers while at the warehouse location.

An exemplary process for discontinuing engagement between the yard truck and the freight trailer includes initially raising a hydraulic fifth wheel on the yard truck to raise the front end of the trailer above its normal ride height. While the front end is raised, the yard truck driver lowers landing gear of the freight trailer, which comprises a pair of equal length jacks permanently mounted to the trailer, so that lowering of the fifth wheel is operative to set down the freight trailer on its landing gear. When the freight trailer is set down on its landing gear, the freight trailer is freestanding (i.e., without a mechanical connection between the kingpin of the freight trailer and the fifth wheel of the yard truck). After the freight trailer is freestanding, associated pneumatic and electrical connections between the yard truck and trailer are disconnected so that the brakes of the freight trailer are locked. Thereafter, the yard truck pulls out from under the freight trailer, thereby leaving the trailer adjacent to the dock opening and being supported at the front end using only the trailer's landing gear.

When loading and unloading cargo from a freestanding freight trailer, the movement of the lift truck along the floor of the freight trailer causes the freight trailer to move as well. While some movement of the freight trailer is inevitable, considerable movement can result in the trailer becoming separated from the dock or possibly tipping over. More importantly, the landing gear of the freight trailer is not designed to accommodate the weight of a fully loaded trailer, let alone the dynamic forces generated by a lift truck moving through a partially loaded freight trailer. Even further, the high center of gravity associated with most trailers makes the likelihood of tipping over a real possibility. The obvious implications of a freight trailer tipping over include damage to the goods within the trailer, the trailer itself, and the lift truck, not to mention the possible serious injury to or death of the lift truck operator.

There is a need in the industry for a reliable support that maintains the relative position of the freight trailer with respect to the dock and inhibits the trailer from tipping over, possibly causing serious bodily injury or death, which does not rely solely on the landing gear of the freight trailer.

INTRODUCTION TO THE INVENTION

The present disclosure is directed to supports associated with a loading/unloading dock and, more specifically, to repositionable supports that secure freight trailers in position at a loading dock while dock personnel load and/or unload cargo from the trailers. The present disclosure includes a repositionable structure having a fifth wheel to capture the kingpin of a freight trailer, thereby securing the repositionable structure to the trailer. The repositionable support may also include one or more of an electrical, a hydraulic, and a pneumatic interface for coupling directly to the yard truck or other truck using conventional connections, such as glad hands and electrical disconnects. Unlike conventional stabilizing products, the exemplary embodiments of the instant disclosure may provide support for the front end of a parked freight trailer without the need for deployment of the landing gear (i.e., the landing gear touching the ground). After the repositionable structure has been mounted to the trailer by way of the kingpin and fifth wheel interface, wheel chocks may be deployed and brakes associated with the repositionable device may be locked to inhibit horizontal movement of the trailer away from the loading dock. In exemplary form, the repositionable structure may include a winch that is adapted to engage a pavement cleat, thereby forming a compression fit between the king pin and fifth wheel of the repositionable support using the tension from the winch cable. The repositionable support may also include a communicator operative to relay a communication to an internal display within the warehouse that indicates whether the repositionable support is properly mounted to the freight trailer.

An exemplary repositionable structure includes a frame and an axle mounted to the frame. By way of example, the axle includes a pair of tandem wheels, with brakes, mounted proximate opposite ends of the axle. However, the wheels may be single wheels and not include brakes. A vertically repositionable fifth wheel is also mounted to the frame and is adapted to receive the kingpin of a freight trailer. A pair of repositionable wheel chocks may also be mounted to the frame. Also on board the frame may be a freight trailer positioning communicator adapted to signal a warehouse display indicating whether the trailer has been secured while at the loading dock. Pneumatic, hydraulic, and electrical lines may also be associated with the frame that are in communication with any wheel brakes, the repositionable fifth wheel, and any positioning communicator. The foregoing lines may be powered directly from the yard truck, or the frame may include individual power sources for one or more of the foregoing lines.

After the yard truck has positioned the repositionable support into engagement with the kingpin of the freight trailer, the brakes (if included) are applied and the winch (if included) is deployed to lock the support in position below a frontal portion of the trailer. Thereafter, the support remains under the frontal portion of the trailer as the trailer is loaded or unloaded. Similarly, after the support is secured in position beneath the frontal portion of the freight trailer, the yard truck disconnects from the repositionable structure and continues jockeying the remaining freight trailers at the warehouse location.

BRIEF DESCRIPTION OF THE DRAWINGS

FIG. 13 is a profile view of the exemplary draw bar and associated hook in FIG. 11.

FIG. 14 is a top view of the exemplary draw bar and associated hook in FIG. 11.

DETAILED DESCRIPTION

Figure 1:
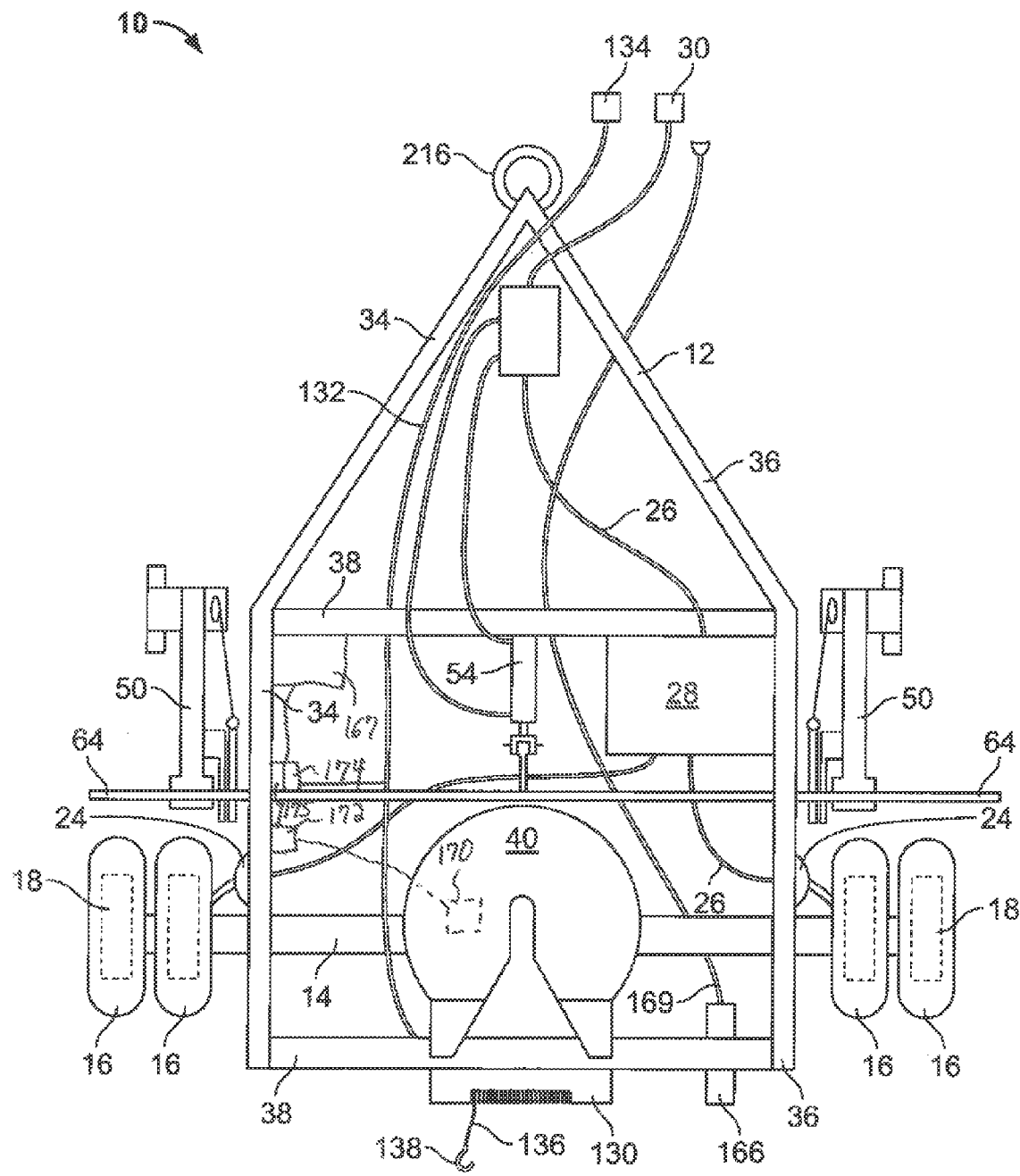
FIG. 1 is an overhead view of an exemplary trailer stabilizer in accordance with the instant disclosure.

The exemplary embodiments of the present disclosure are described and illustrated below to encompass apparatuses and associated methods to secure a freight trailer in position at a loading dock while the trailer is loaded or unloaded. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps and features that one of ordinary skill should recognize as not being a requisite to fall within the scope and spirit of the present disclosure.

Referencing FIGS. 1-7, an exemplary trailer support 10 includes a frame 12 and an axle 14 mounted to the frame 12. The axle 14 includes one or more wheels 16 mounted proximate the ends of the axle 14. In this exemplary embodiment, the axle 14 includes tandem wheels 16 mounted at each end, with the tandem wheels including an associated braking assembly 18. However, it should be noted that the wheels 16 are not required to include a braking assembly 18.

Figure 2:
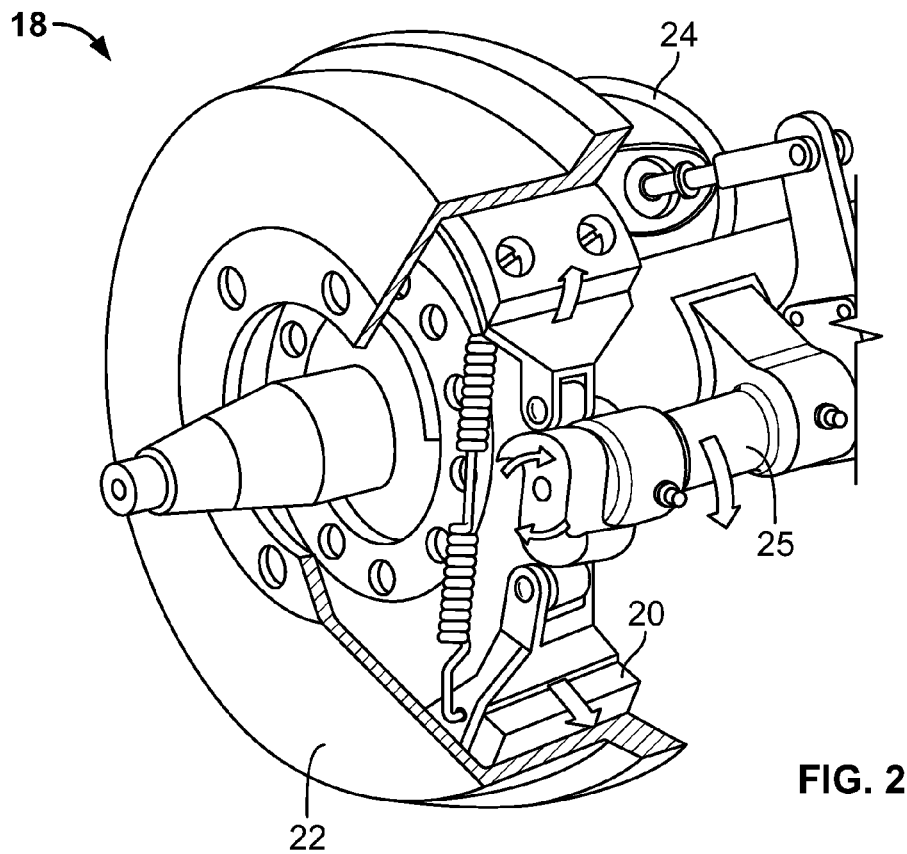
FIG. 2 is a perspective, cut away view of an exemplary brake assembly for use with the exemplary trailer stabilizer of FIG. 1.
Figure 3:
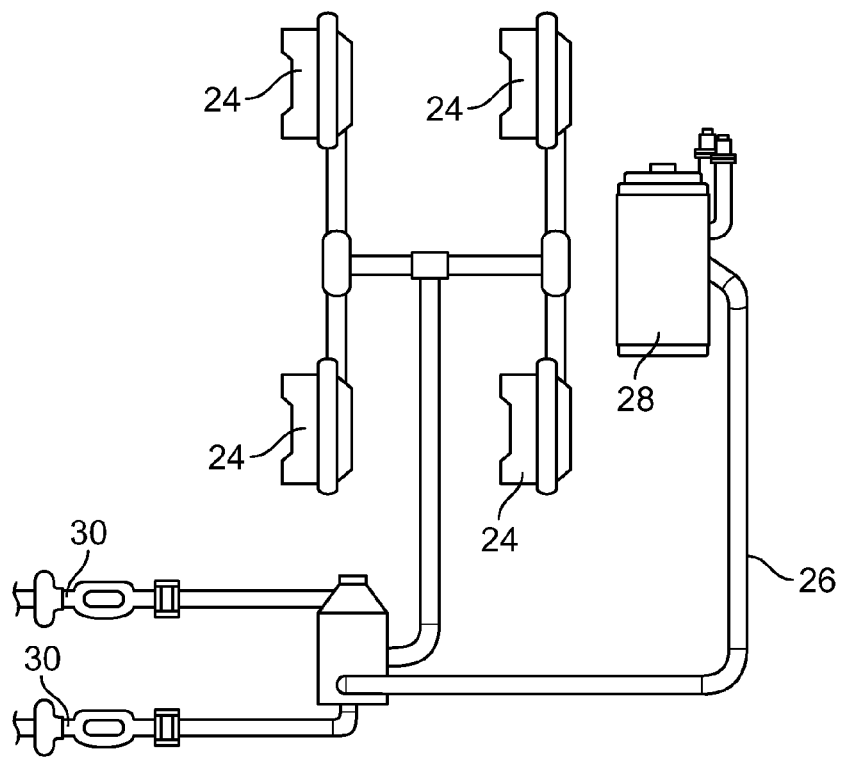
FIG. 3 is a schematic diagram of an exemplary braking system for use with the exemplary trailer stabilizer of FIG. 1.

Referring specifically to FIGS. 1-3, the braking assembly 18 includes a brake pad 20 which applies a force necessary to either a drum or disc 22 to retard rotation of the brake drum and wheel 16 with respect to the axle 14. A pneumatic brake cylinder 24 is coupled to the brake pads 20 by way of a push rod and cam shaft 25 in order to force the pads 20 against the drum 22 after a predetermined positive pressure is reached within the pneumatic lines 26 feeding the brake chamber. However, the brake cylinder 24 is also operative to force the pads 20 against the drums 22 when insufficient air pressure occurs within the pneumatic lines 26 feeding the cylinder 24. By way of example, if an air leak occurs within the pneumatic line or a yard truck 200 (see FIG. 8) is not pneumatically coupled to the trailer support 10, the brake pads 20 will engage the drums 22 to inhibit rotation of the wheels 16. In other words, it takes a positive air pressure within the pneumatic brake lines 26 in order to discontinue engagement between the brake pads 20 and the drums 22. In this exemplary embodiment, the pneumatic lines 26 are in series with a compressed air storage vessel/tank 28 that is mounted to the frame 12. Thus, the compressed air storage vessel 28 provides an on-frame reservoir of compressed air.

As will be discussed in more detail hereafter, the pneumatic lines 26 also includes quick connects 30 (e.g, a glad hand) adapted to be coupled to quick connects 32 of the yard truck 200 in order for the yard truck to supply compressed air to the braking assembly 18.

Referring back to FIG. 1, the frame 12 includes a pair of C-shaped cross-section frame rails 34, 36 that are equally spaced apart from one another and oriented in parallel toward the rear of the trailer support 10. Toward the front of the trailer support 10, the frame rails 34, 36 are angled toward one another and eventually converge proximate the front of the trailer support. For the sections of the frame rails 34, 36 oriented in parallel, one or more cross-members 38 are joined to the frame rails, such as by welding or bolted fasteners. The cross members 38 may optionally include a block C-shape cross-section.

The frame 12 also has mounted to it a fifth wheel 40. Exemplary fifth wheels 40 include class 6, 7, and 8 fifth wheels such as the Fontaine No-Slack 6000 and 7000 Series, available from Fontaine International (www.fifthwheel-.com). In this exemplary embodiment, the fifth wheel 40 is mounted in an elevated fashion above the frame rails 34, 36 using conventional nut and bolt fasteners. Those skilled in the art will understand that other fifth wheels 40 besides a Fontaine No-Slack may be utilized so long as the fifth wheel is operative to selectively engage and disengage a kingpin of a freight trailer. It should also be noted that the kingpin lock/receiver may be pneumatically, electrically, or hydraulically operated, or may simply be manually operated. Those skilled in the art are familiar with the various types of fifth wheels and the various types of locks/receivers that hold the kingpin of a freight trailer in place until it is intentionally released.

Referencing FIGS. 1 and 4-6, the trailer support 10 may also include a pair of repositionable wheel chocks 50 that operate to retard rolling motion of the wheels 16 when deployed. In exemplary form, each wheel chock 50 is mounted to a repositioning device 52 that utilizes fluid power (pneumatic, hydraulic, etc.) to switch between deployment and storage of the wheel chocks 50. It should also be noted that the wheel chocks 50 may alternatively be deployed using a manual crank (not shown) that is mounted to the through rod 64. In either circumstance, when the wheel chocks 50 are deployed, the chocks are wedged between the wheels 16 and the ground. Consequently, as the wheels 16 attempt to rotate forward, the deployed chocks 50 provide a resistive force sufficient to retard forward rotation of the wheels. Conversely, when the chocks 50 are stored, the wheels 16 are able to rotate (forward or rearward), presuming some other device is not operative to retard rotational motion such as the braking assembly 18.

Figure 4:
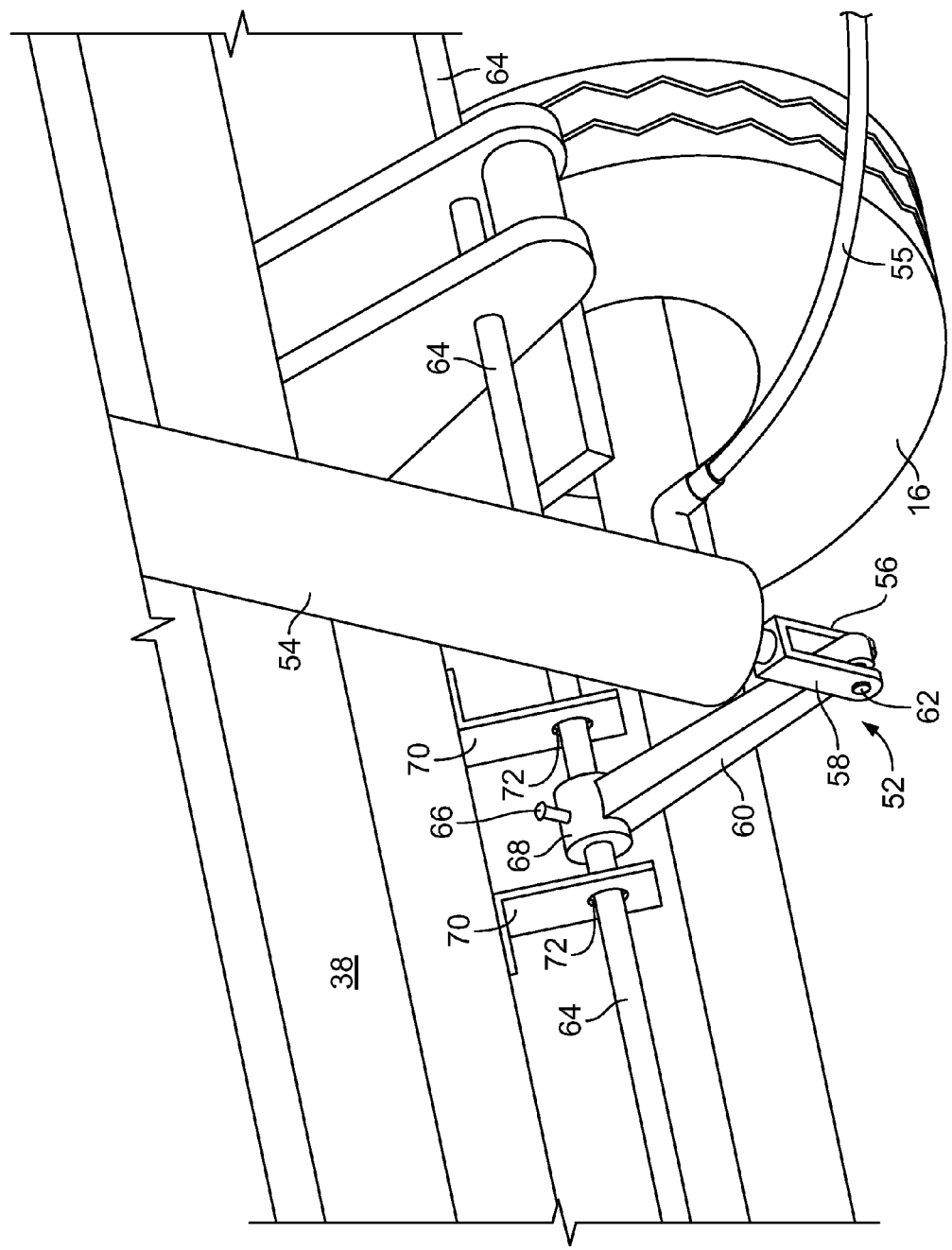
FIG. 4 is an underneath, perspective view of an exemplary repositioning assembly for use in repositioning the wheel chocks of the exemplary trailer stabilizer of FIG. 1.

Referring to FIGS. 1 and 4, the repositioning device 52 includes a pneumatic cylinder 54, which is supplied with air from pneumatic supply lines 55. One end of the pneumatic cylinder 54 is mounted to the underside of the cross-member 38. The opposite end of the pneumatic cylinder 54 includes an actuating piston 56 with a clevis 58 mounted to the far end of the piston. The clevis 58 is pivotally mounted to an L-shaped bracket 60 by way of a pin 62 that extends through both the clevis and bracket. A through rod 64, having a circular cross-section, is received within a cylindrical cavity formed by a cylindrical housing 68 mounted to the opposite end of the L-shaped bracket 60. A through hole extending into the cylindrical cavity is threaded to receive a fastener, such as a bolt 66, that extends into contact with an exterior of the through rod 64 to secure the cylindrical housing 68 to the through rod 64. Accordingly, rotational motion of the cylindrical housing 68, when the bolt 66 is tightened within the through hole, is transferred to the through rod 64, thereby causing the through rod to correspondingly rotate when the cylindrical housing is rotated. The rotational motion of the through rod 64 is transferred to the chocks 50 and is operative to reposition the chocks 50 between deployment and storage positions.

In this exemplary embodiment, the through rod 64 is located beneath and mounted to a cross-member 38 of the frame 12 using several brackets 70 with circular bushings 72. The bushings 72 operate to allow the through rod 64 to axially rotate with respect to the brackets 70, while retaining the horizontal and vertical position of the through rod. In exemplary form, a single through rod 64 is utilized to extend across the entire width of the frame 12 and outward beyond the frame in front of the wheels 16.

Figure 5:
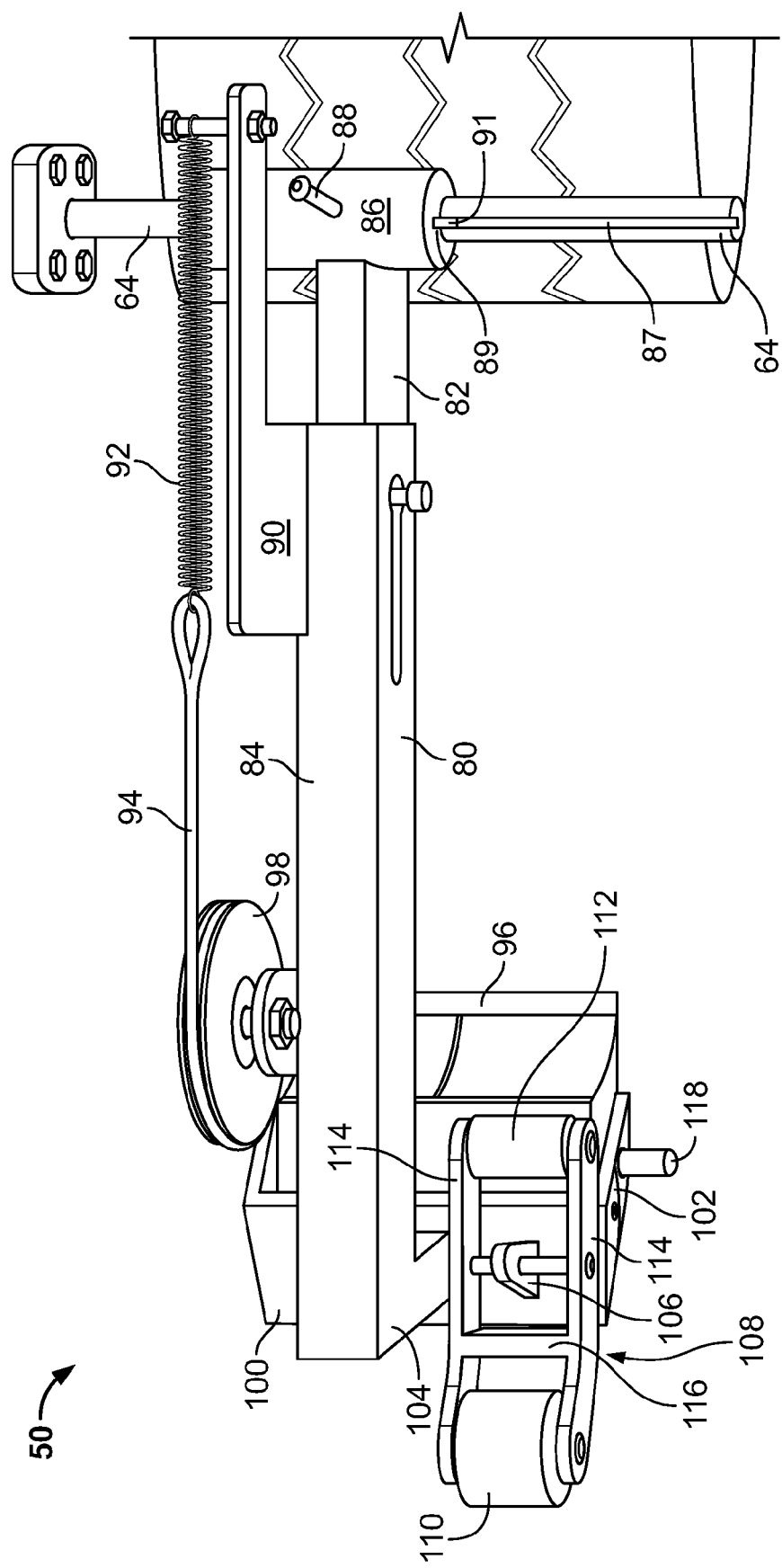
FIG. 5 is an elevated perspective view of a repositionable wheel chock, in the storage position, for use with the exemplary trailer stabilizer of FIG. 1.
Figure 6:
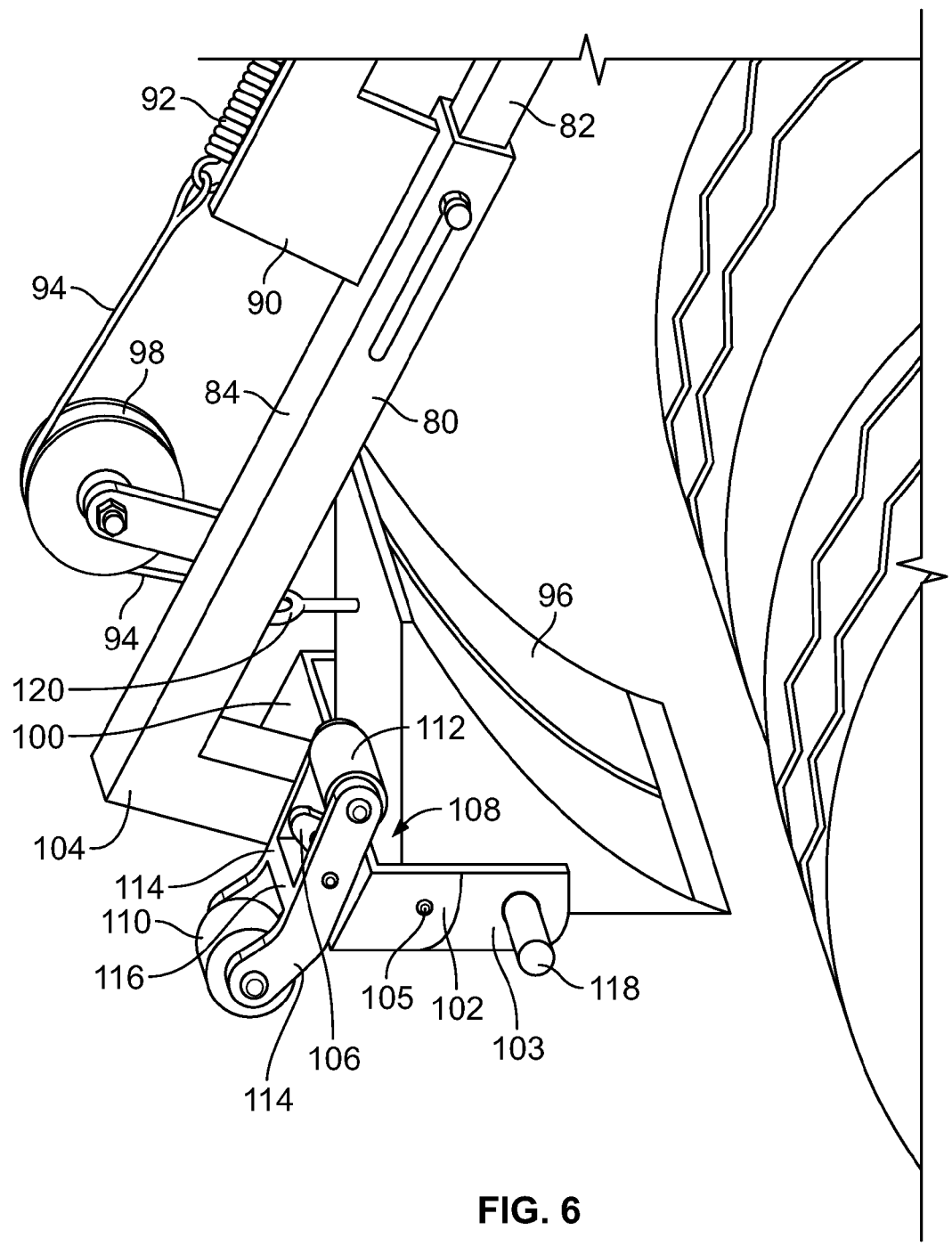
FIG. 6 is an elevated perspective view of the repositionable wheel chock of FIG. 6, shown just prior to complete deployment.

Referencing FIGS. 1, 5 and 6, each repositionable wheel chock 50 includes a telescopic pole 80 mounted to the through rod 64 that extends laterally beyond the frame 12. In exemplary form, the telescopic pole 80 comprises a first hollow tube 82 and a second, larger hollow tube 84, where the first tube has an exterior that is small enough to be received within the interior of the second tube. Because of the size differential between the tubes 82, 84, the tubes are operative to slide against one another to increase or decrease the length of the pole 80 as necessary. In this regard, the second tube 84 has a closed opposite end that optionally houses a spring (not shown), which is operative to bias the first hollow tube 82 with respect to the second tube. However, it should be noted that the tubes need not be telescopic or operative to slide with respect to one another in order to deploy the wheel chock 50. For example, tubes 82, 84 may be replaced by a single tube or multiple tubes that are rigidly mounted to one another to avoid longitudinal length changes.

Opposite the closed end of the second tube 84, the first tube 82 includes a transverse hollow cylinder 86. A cavity on the interior of the cylinder 86 allows for throughput of the through rod 64. Additionally, the through rod 64 includes a longitudinal keyway 87 formed on its exterior that is aligned with a longitudinal keyway 89 formed on the interior of the cylinder 86. In this fashion, after the keyways 87, 89 have been aligned (i.e., overlap) with one another, a key 91 is inserted into both keyways 87, 89 so that rotation of the through rod 64 results in corresponding rotation of the cylinder 86. In this exemplary embodiment, the keyways 87, 89 exhibit a rectangular, axial cross-section that accommodates the key 91, which also exhibits a rectangular, axial cross-section. A hole (not shown), which extends through the cylinder 86 and into the keyway 89, is adapted to receive a threaded fastener 88. By inserting the threaded fastener 88 into the hole, where the hole overlaps the keyway 89, the threaded fastener is operative to contact the key 91 and lock the key within the keyways 87, 89.

Opposite the closed end of the second tube 84, an arm 90 is mounted to the lateral exterior of the second tube. The arm 90 extends away from the closed end of the second tube 84 and extends beyond the open end of the second tube 84 in parallel with the first tube 82. In this exemplary embodiment, the arm 90 by way of a through bolt is mounted to a spring 92, where the spring is coupled to a cable 94, which is itself mounted to a chock block 96. As will be discussed in more detail below, the spring 92 provides a tension force that retains the chock block 96 in a predetermined position, thereby retarding the chock block 96 from digging into the ground as the repositionable wheel chock 50 is moved from its storage position to its deployment position. In order to maintain the proper tension on the chock block 96, a guide pulley 98 is mounted to the second tube 84, where the guide pulley 98 receives the cable 94.

Proximate the closed end of the second tube 84, a bracket 100 is mounted to the second tube. This bracket 100, in exemplary form, includes a block C-shaped segment 102 that is spaced apart from the second tube by way of an extension 104. The blockC-shaped segment 102 includes extension plates 103 pivotally mounted by way of a pivot pin 105 to allow articulation of the chock block 96 and provide an allowance for coaxial discrepancy between the through rod 64 and the stabilizer's wheels 16. A guide arm 106 is mounted to the rear exterior of the C-shaped segment 102. In this exemplary embodiment, the guide arm 106 includes a through hole that receives a fastener to pivotally mount a roller assembly 108 to the guide arm.

The roller assembly 108 includes a first roller 110 mounted opposite a second roller 112, where both rollers are mounted to opposing rails 114 that are tied together by a cross-brace 116. The first roller 110 is rotationally repositionable with respect to the rails 114 and is adapted to contact the ground when the wheel chock 50 is deployed in its barrier or deployment position. Similarly, the second roller 112 is rotationally repositionable with respect to the rails 114 and is adapted to contact the rear of the chock block 96 and overcome the bias of the spring 92 to rotate the chock block when the first roller 110 reaches the ground.

The chock block 96 is accommodated within the C-shaped segment 102. The chock block 96 is pivotally mounted to the extension plates 103 by way of a pivot shaft 118 that concurrently extends through the chock block and the extension plates. A rear portion of the chock block 96 includes a connector 120 that couples the chock block to the cable 94.

Figure 7:
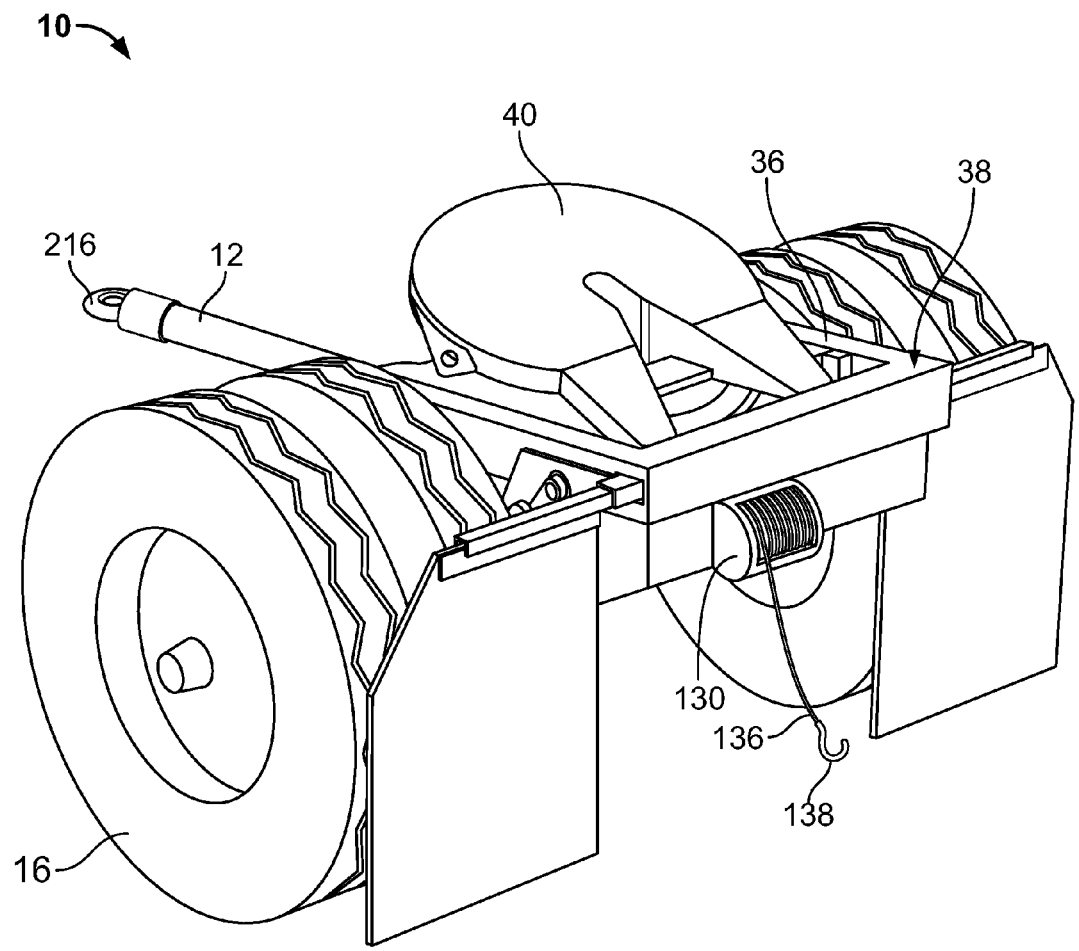
FIG. 7 is an elevated perspective view of the exemplary trailer stabilizer of FIG. 1.

Referring to FIGS. 1 and 7, the trailer support 10 may also includes a winch 130 mounted to a rear cross member 38. The winch 130 may be pneumatically, hydraulically, or electrically driven using a power connection line 132 that includes a quick connect 134 in order to receive power from a power source, such as from a yard truck 200 (see FIG. 8). Alternatively, the winch 130 could be manually actuated using a hand crank (not shown). In this exemplary embodiment, the winch 130 includes a motor and a cable 136 mounted to a rotating spool. A free end of the cable 136 includes a hook 138 that is adapted to interface with a ground cleat 150 (see FIG. 9) in order to pull the rear of the trailer support 10 toward the ground cleat. For use with the instant embodiment, exemplary electric winches 130 include, without limitation, the RN30W Rufnek worm gear winch available from Tulsa Winch (www.team-twg.com).

Figure 10:
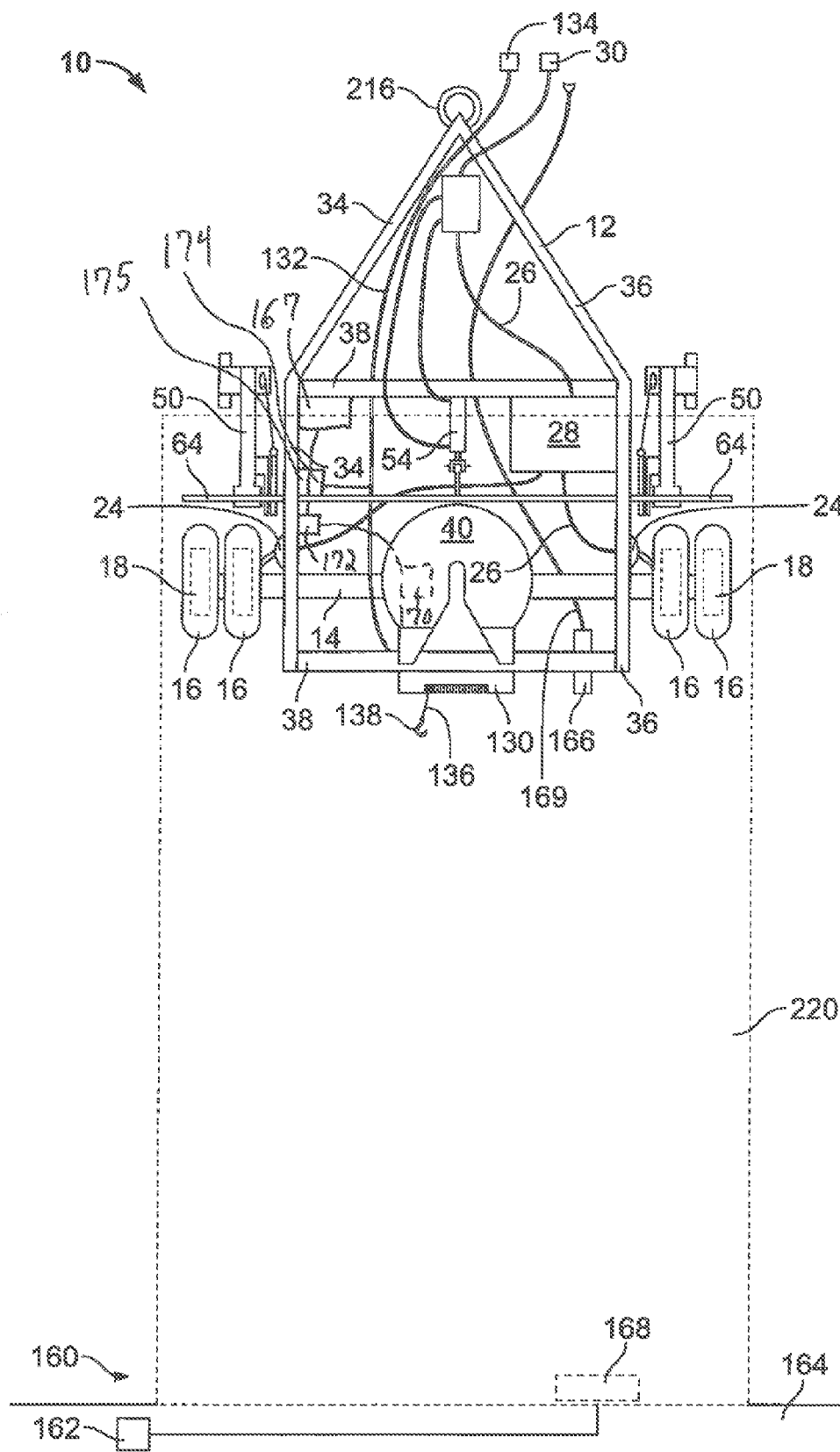
FIG. 10 is an overhead view of an exemplary layout at a warehouse or loading dock facility showing placement of the trailer stabilizer of FIG. 1 and the visual display components.

Referencing FIGS. 1 and 10, the trailer support 10 may further include a signaling system 160. This signaling system 160 provides a visual display 162 that alerts personnel within a warehouse or loading dock facility 164 when the trailer 220 is stabilized using the trailer support 10. In exemplary form, the visual display 162 is mounted on the interior of the warehouse or loading dock facility 164 proximate the loading dock. As will be appreciated by those skilled in the art, when the rear of the trailer 220 is backed up adjacent and aligned with respect to the loading dock opening, personnel within the warehouse or loading dock facility 164 often cannot see through the loading dock opening because the rear of the trailer 220 is occupying the entire loading dock opening. Therefore, the visual display 160 takes the place of a manual visual inspection and indicates whether the trailer 220 is stabilized or not to accommodate for the absence of a direct line of sight. In order for the visual display 160 to know when to display an indicia that it is safe to load/unload the trailer 220, the trailer stabilizer 10 includes an on-board infrared light source 166.

Figure 8:
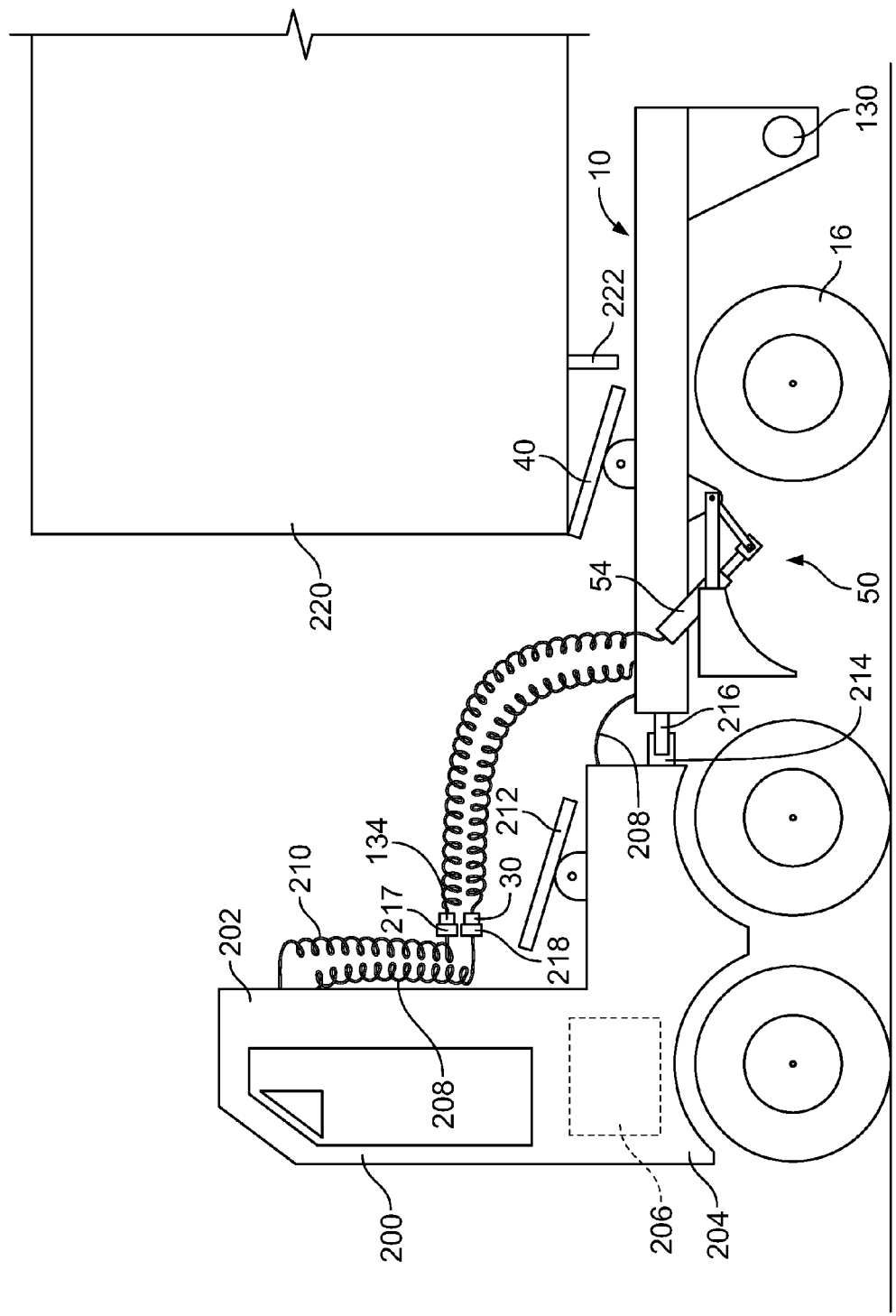
FIG. 8 is a profile view of an exemplary yard truck coupled to the trailer stabilizer of FIG. 1, shown being backed under a commercial freight trailer.

In this exemplary embodiment, the infrared light source 166 is powered by an electrical source associated with the yard truck 200 (see FIG. 8). However, it should be noted that the infrared light source could also be powered by an on-board power source 167 (such as a battery or generator) associated with the trailer stabilizer 10. The infrared light source 166 is selectively powered, however, only after the trailer support 10 has been secured. The infrared light source 166, when powered, is operative to generate infrared light that is detected by an infrared detector 168 located on the exterior of the warehouse or loading dock facility 164. When infrared light is detected by the detector 168, the detector communicates this detection to the visual display 162 so that personnel within the warehouse or loading dock facility 164 know it is safe to load or unload the trailer 220. However, the visual display 160 may provide more than a simple visual indication that the trailer stabilizer is secured.

The signaling system 160 also includes a kingpin sensor 170 and a wheel chock sensor 172. The kingpin sensor 170 is operative to determine whether or not a trailer kingpin 222 (see FIG. 8) is secured to the fifth wheel 40. When the kingpin 222 is secured to the fifth wheel 40, the sensor 170 senses the position of the kingpin within the opening of the fifth wheel. The sensor 170 may also include an ancillary sensor (not shown) that confirms the kingpin 222 is locked within the fifth wheel 40. Likewise, the wheel chock sensor 172 is operative to detect the position of the wheel chocks 50, such as when the wheel chocks are deployed on the ground in a blocking position directly in front of the wheels 16. Both the kingpin sensor 170 and the wheel chock sensor 172 are in communication with a controller 174 that uses a wireless transmitter 175 to communicate information concerning the position of the kingpin 222 and the position of the wheel chocks 50 to the visual display 160, which itself includes a wireless receiver.

Figure 9:
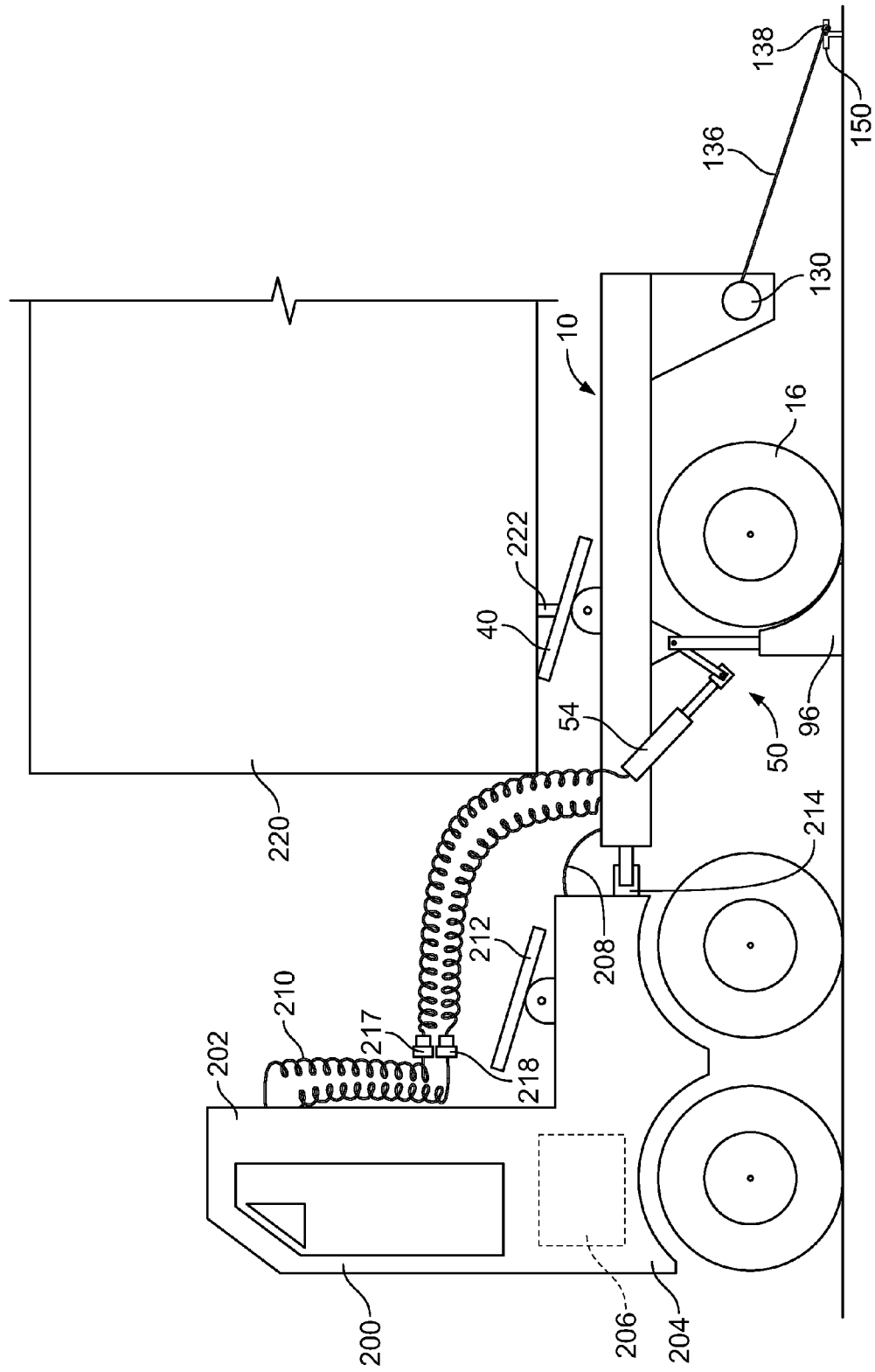
FIG. 9 is a profile view of the trailer stabilizer of FIG. 1 mounted and secured to the commercial freight trailer of FIG. 8.

Referring to FIGS. 8 and 9, a yard truck 200 includes a cab 202, a chassis 204, an engine 206, electrical connections 208, pneumatic connections 210, and a repositionable fifth wheel 212. In addition, the yard truck 200 includes a tow hook 214 that receives the tow eye 216 of the trailer support 10 in order to couple the yard truck 200 to the trailer support 10.

In practice, the yard truck 200 attaches itself to the trailer support 10 by way of the yard truck's tow hook 214 being coupled to the tow eye 216 of the trailer support 10. In addition to attaching the yard truck 200 to the trailer support 10 using the hook 214 and eye 216, the yard truck operator also connects quick connects 134, 30 of the trailer stabilizer 10 to quick connects 217, 218 associated with the yard truck to supply electrical and pneumatic power. It should also be noted that the yard truck 200 may include hydraulic pump(s), lines, and connections (not shown) that connect to connections, lines, and devices of the trailer support 10, such as when the winch 130 and/or repositioning device 52 is hydraulically driven. After completing connections between the yard truck 200 and the trailer support 10, the yard truck operator then drives the yard truck into position with respect to a trailer 220 having already been parked at a loading dock so that the doors of the trailer are open and the associated opening at the rear of the trailer is adjacent a loading dock opening.

At such a point in time, the trailer 220 is initially supported by its landing gear (not shown). But, as discussed previously, the landing gear is not made to accommodate the high forces associated with a forklift repetitively entering and exiting the trailer to load or unload goods. As is evident to those skilled in the art, when loading a trailer, the initial weight of the loaded goods is positioned at the front of the trailer and is disproportionally born by the landing gear. Similarly, when a trailer is unloaded, the last weight to be taken off the trailer comes from the goods located at the front of the trailer, where this weight is disproportionally born by the landing gear. In order to ensure that the trailer does not nosedive in case of landing gear failure, or that the trailer tips over on either lateral side, the instant disclosure provides a stabilizing device to retard nose dive or lateral tip over.

Referring again to FIGS. 8 and 9, after the yard truck 200 has attached itself to the trailer stabilizer 10 and located a trailer that has yet to be stabilized, the yard truck thereafter backs the trailer stabilizer 10 underneath the trailer 220. When backing the trailer stabilizer 10, the rear of the stabilizer (where the winch 130 is located) moves underneath the trailer first and is aligned so that the fifth wheel 40 receives the trailer kingpin 222. While the trailer stabilizer 10 is being backed underneath the trailer 220 and before the kingpin 222 is secured within the fifth wheel 40, the repositionable wheel chocks 50 are in a storage position and the brake assemblies 18 are free (i.e., not locked). It should also be noted that while the yard truck 200 is backing the stabilizer 10 underneath the trailer 220, the winch 130 is preferably retracted. Continued backing of the yard truck 200 causes the trailer stabilizer 10 to be further repositioned underneath the trailer 220, eventually so much so that the kingpin 222 engages the fifth wheel 40 and becomes locked within the fifth wheel, thereby coupling the trailer stabilizer to the trailer. At this time, the kingpin sensor 170 detects the position of the kingpin 222 with respect to the fifth wheel 40 and communicates a signal indicative of the kingpin position to the controller 174 (see FIG. 1). Thereafter, the controller 174 wirelessly communicates a signal to the visual display 168 (see FIG. 10), which in turn displays visual indicia representing to dock workers that the kingpin 222 is secured to the trailer stabilizer 10.

After the trailer stabilizer 10 is coupled to the trailer 220, a number of events occur to lock the position of the trailer stabilizer with respect to the trailer. One of these events may include the yard truck operator locking the braking assembly 18 of the trailer stabilizer by depressurizing the pneumatic lines 26 (see FIG. 1). This depressurization causes the brake pads 20 (see FIG. 2) to be forced against the brake drum/disc 22, thereby retarding rotational motion of the wheels 16. Another possible event is the deployment of the repositionable wheel chocks 50 using the repositioning device 52.

The yard truck operator controls, using standard internal controls within the yard truck 200 to control the air pressure though line 210, the pneumatic pressure applied to the pneumatic cylinder 54 to extend or retract the piston 56, thereby rotating the through rod 64 in either a clockwise or a counterclockwise direction. As discussed previously, rotation of the through rod 64 is operative to reposition the wheel chocks 50 between the storage position and the blocking position. In this manner, the yard truck operator is able to lower or raise the wheel chocks 50 without ever leaving the cab of the yard truck 200. When the wheel chocks 50 are deployed so that the chocks are in front and adjacent at least one of the wheels 16, the wheel chock sensor 172 senses this position and communicates a signal to the controller 174 (see FIG. 1). Thereafter, the controller 174 wirelessly communicates a signal to the visual display 168 (see FIG. 10), which in turn displays visual indicia representing to dock workers that one or all of the wheel chocks 50 is deployed in a blocking position with respect to the wheels 16 of the trailer stabilizer 10. But the yard truck operator may need to exit the cab to couple the cable 136 and hook 138 to the ground, as well as to disconnect pneumatic and electrical connections extending from the yard truck 200 to the trailer stabilizer 10.

In exemplary form, after the brake assembly 18 has been locked and the wheel chocks 50 have been deployed, the yard truck operator may exit the cab to secure the trailer support 10 to the ground using the winch 130. The winch may be powered from an electrical power source on board the trailer stabilizer 10 or on board the yard truck 200. In either circumstance, the winch 130 is unwound a predetermined amount so that there is enough cable 136 for the hook 138 to reach the ground cleat 150. The hook 138 is thereafter mounted to the cleat 150, and the winch 130 is driven to wind the cable 136 in order to remove the slack from the line. The winch 130 associated controls (not shown) that are operative to discontinue winding of the cable 136 after the cable reaches a predetermined tension. When taught, the cable 136 and winch 130 are operative to pull the trailer stabilizer 10 toward the rear of the trailer 220, which acts to pull the fifth wheel 40 toward the rear of the trailer. Because the fifth wheel 40 at this point has received the kingpin 222, the fifth wheel 40 pushes against the front of the kingpin to effectively wedge the trailer 220 between the loading dock (not shown) and the fifth wheel 40 and wedge the kingpin between the fifth wheel 40 and the ground cleat 150.

As soon as the winching operation is complete, a switch 169 associated with the infrared light source 166 is tripped, thereby powering the light source and generating infrared light. The placement of the infrared light source 166 is at the rear of the trailer support 10 and is designed to provide a direct line of sight between the light source and the light detector 168 (see FIG. 10) mounted to the warehouse or loading dock facility 164. It should be noted that the light source may be powered by the yard truck 200 or may be powered by an on-board energy source (not shown) such as a generator or a battery. In exemplary form, the light source includes a timing circuit that only allows the infrared light source to be powered for a predetermined time. Regardless of the power source used, the light source 166 is operative to generate infrared light that will be detected by the detector 168.

The detector 168, which is mounted to the warehouse or loading dock facility 164, is operative to detect infrared light generated by the light source 166. When infrared light is detected by the detector 168, a signal is sent to the visual display 162 indicating that the trailer stabilizer 10 is in a secured position with respect to the trailer 220. In exemplary form, the visual display 162 includes a red and green light. When illuminated, the red light indicates that the trailer 220 parked at the loading dock is not ready to be loaded or unloaded because the trailer support 10 has not yet been secured to the trailer. In contrast, when illuminated, the green light indicates that the trailer 220 parked at the loading dock is ready to be loaded or unloaded because the trailer support 10 is secured to the trailer.

When a trailer 220 is fully loaded or unloaded, the yard truck 200 reattaches itself to the trailer support 10, which includes reattaching the quick connects 30, 134. Thereafter, to the extent the support 10 is coupled to the ground cleat 150, the winch 130 is unwound and the hook 138 is disengaged from the cleat, followed by winding of the cable 136. As soon as the winch cable 136 is unwound, thereby allowing decoupling of the hook 138 from the cleat 150, the infrared light source 166 is powered and generates infrared light. This light is in turn detected by the detector 168, which is operative to send a signal to the visual display 162 indicating that the trailer support 10 is not longer secured to the trailer 220. As discussed previously, a red light is illuminated on the display 162 indicating to dock personnel that it is not safe to load or unload goods from the trailer. It should be noted that in case the visual display 162 gets out of sequence, it may be manually reset to display the red light or some other indicia reflecting that the trailer 220 is not mounted to the trailer support 10.

Presuming the winch 130 has been disengaged from the cleat 150 or not even used, the yard truck operator the supplies power to the repositioning device 52 in order to retract the repositionable wheel chocks 50. Presuming the wheel chocks 50 were not used or have already been retracted, the yard truck operator supplies power to the brake assemblies 18 in order to free the brakes and allow the wheels to turn with respect to the frame 12. At this point, the kingpin 222 is released from the fifth wheel 40 and the trailer support may be removed from under the trailer 220. At the point in time where the trailer stabilizer 10 is removed from under the front of the trailer 220, it is up to the landing gear to support the frontal load of the trailer.

Figure 11:
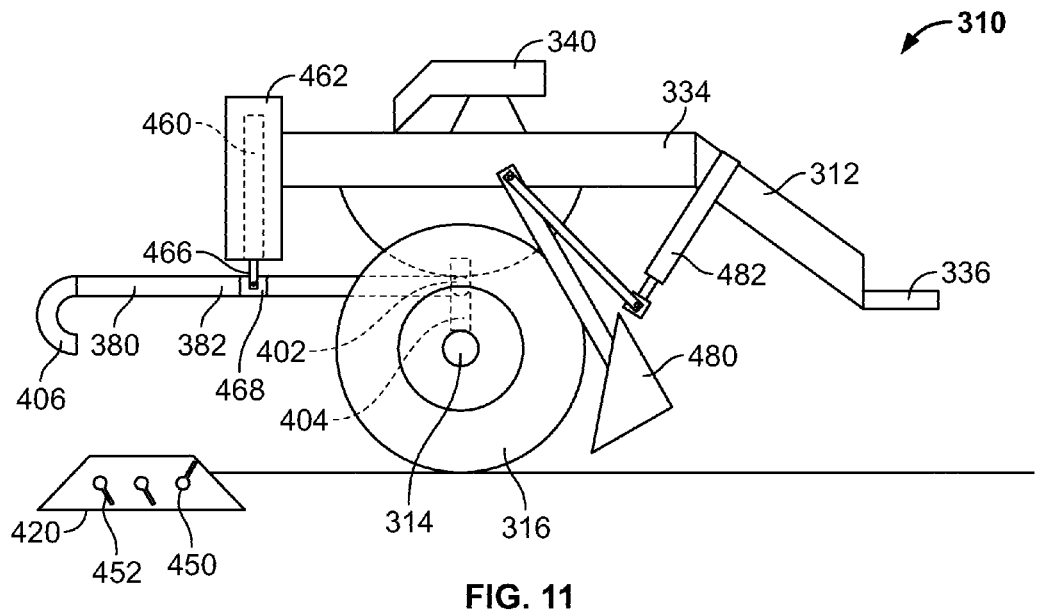
FIG. 11 is a profile view of another exemplary trailer stabilizer in a disengaged position.
Figure 12:
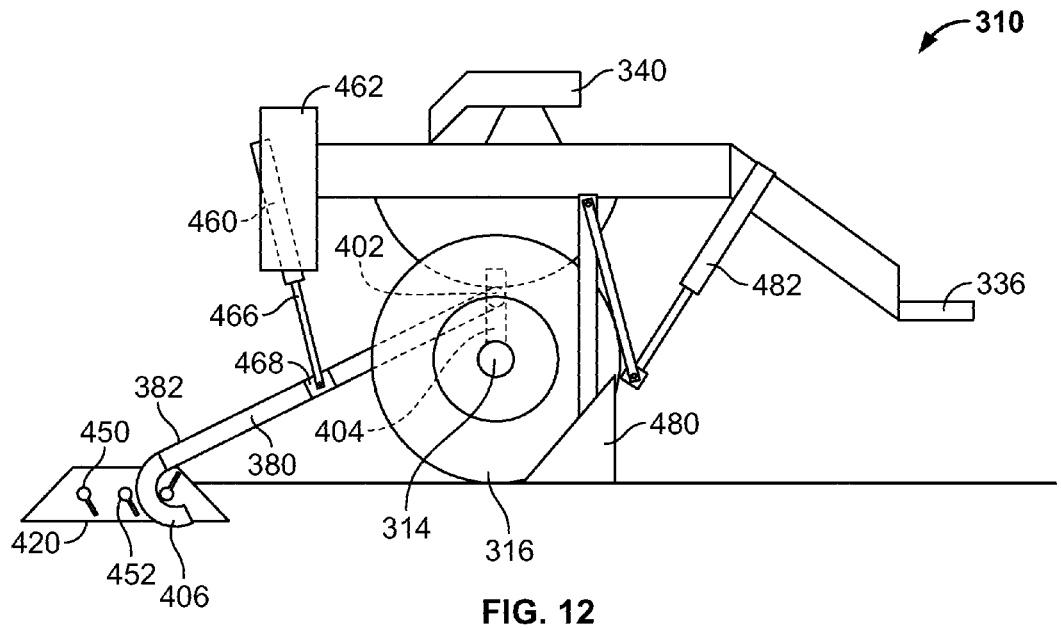
FIG. 12 is a profile view of the exemplary trailer stabilizer of FIG. 11 in an engaged position.

Referring to FIGS. 11 and 12, a second exemplary trailer support 310 includes a frame 312 and an axle 314 mounted to the frame 312. The axle 314 includes one or more wheels 316 mounted proximate the ends of the axle 314. In this exemplary embodiment, the axle 314 includes tandem wheels 316 mounted at each end, with the tandem wheels including an associated braking assembly (not shown), which is identical to that of the first exemplary embodiment 10 (see FIGS. 1-3). The braking assembly includes brake pads, brake drum/discs, and a pneumatic brake cylinder to apply a brake force to the trailer support 310 when insufficient air pressure occurs within the pneumatic line feeding the cylinder. For purposes of brevity, reference is had to FIGS. 2 and 3 and the corresponding written description for a braking assembly that may be used as the instant braking assembly 310.

The frame 312 includes a pair of C-shaped cross-section frame rails 334 that are equally spaced apart from one another and oriented in parallel toward the rear of the trailer support 310. Toward the front of the trailer support 310, the frame rails 334 are angled toward one another and eventually converge at a hitch 336 proximate the front of the trailer support. When oriented in parallel, the frame rails 334 are jointed together by mounting one or more cross-members (not shown) to the frame rails (via welding, nuts and bolts, etc.), where the cross-members may optionally include a block C-shape cross-section.

At least one of the cross-members of the frame 312 has mounted to it a fifth wheel 340 in an elevated fashion above the frame rails 334 (using conventional nut and bolt fasteners and/or welds). Again, the fifth wheel 340 is analogous to the fifth wheel 40 discussed with respect to the first exemplary embodiment 10.

The trailer support 310 also includes an actuatable draw bar and associated hook 380 that is pivotally mounted to the frame 312 between an elevated position and an engaged position (compare FIGS. 11 and 12). When in the draw bar and associated hook 380 is in the engaged position (see FIG. 12), the hook is at or approximate ground level to engage a cleat 420 mounted to the ground. When the draw bar and associated hook 380 engage the cleat, appreciable forward movement of trailer support 310 away from the cleat 420 is not possible. Conversely, when the draw bar and associated hook 380 is in the disengaged position (see FIG. 11), the hook is above ground level and inoperative to engage the cleat 420. Thus, when the draw bar and associated hook 380 are disengaged from the cleat 420, appreciable forward movement of trailer support 310 may be possible, presuming wheel chocks are not deployed in a barrier position.

Referring to FIGS. 11-14, in this exemplary embodiment, the draw bar and associated hook 380 comprises quarter inch steel rectangular tubing 382 extending longitudinally and having opposing ends 384, 386. At one end 384, a cylindrical coupling 388 is fastened to the tubing, such as by welding, and oriented so that a through opening 400 is generally perpendicular to the longitudinal length of the tubing 382. This opening 400 receives an axle 402 that is mounted to the trailer support 310 so that the coupling 388 pivots around the axle 402. In exemplary form, the axle 402 is sized to concurrently extend through the opening 400 and corresponding openings that are aligned through spaced apart brackets 404 mounted to the trailer support 310 so that the longitudinal ends of the axle extend through the brackets. Each end of the axle 402 includes a radial through hole that is sized to receive a respective cotter pin (not shown) and thereby inhibit the axle from being displaced laterally (i.e., from side to side). One or both of the cotter pins may be removed to allow the axle 402 to be laterally repositioned with respect to the brackets 404 and the cylindrical coupling 388. When the draw bar and associated hook 380 is mounted to the trailer support 310, the cylindrical coupling 388 interposes the brackets 404 so that the through opening 400 is longitudinally aligned with the corresponding openings of the brackets. At the same time, the axle 402 is inserted through the openings in the coupling 388 and brackets 404 so that the ends of the axle extend just beyond the bracket openings. Thereafter, the cotter pins are installed, and the draw bar and associated hook 380 is pivotally mounted to the trailer support 310.

A heavy duty hook 406 is mounted to the end 386 of the rectangular tubing 382 opposite the cylindrical coupling 388. This heavy duty hook 406 is fabricated from high strength steel and includes a linear segment 408 that extends substantially coaxial with the tubing 382. The far end of the segment 408 is rounded over 410. The hook 406 defines a cavity 412 on its interior that is adapted to retain at least one of a plurality of dowel pins 450 associated with the cleat 420 when the draw bar and associated hook 380 is in the engaged position.

Figure 15:
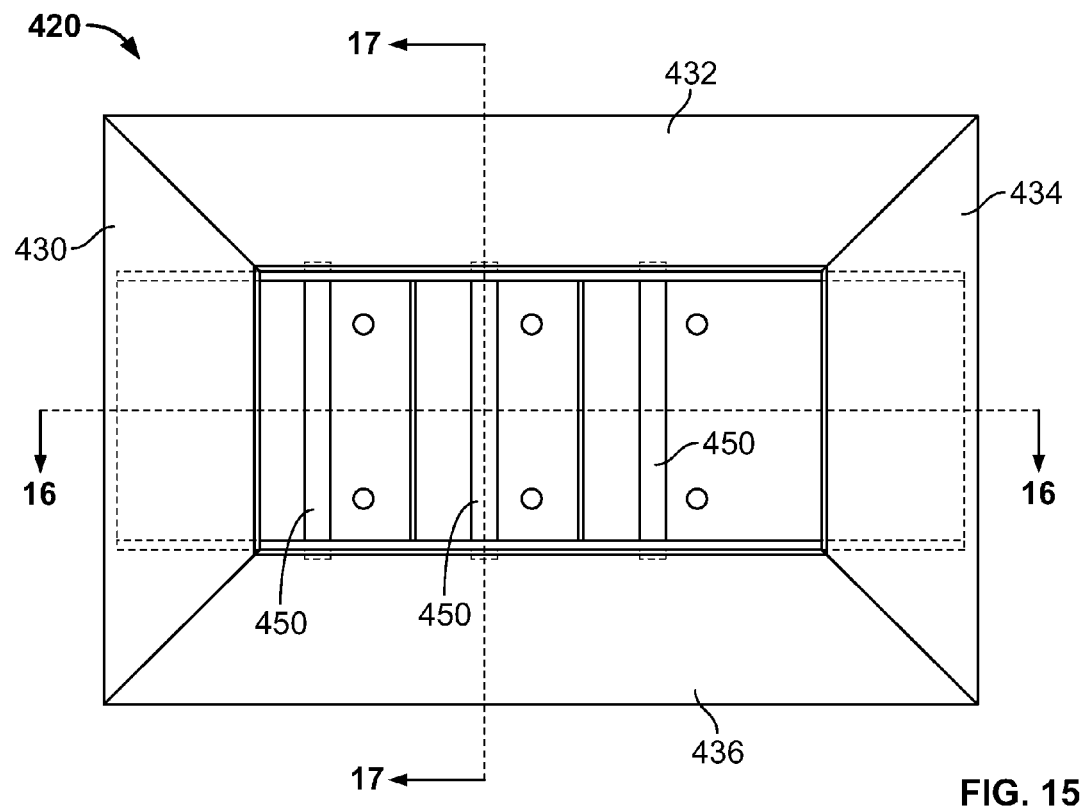
FIG. 15 is a top view of the exemplary pavement cleat in FIG. 11.
Figure 16:
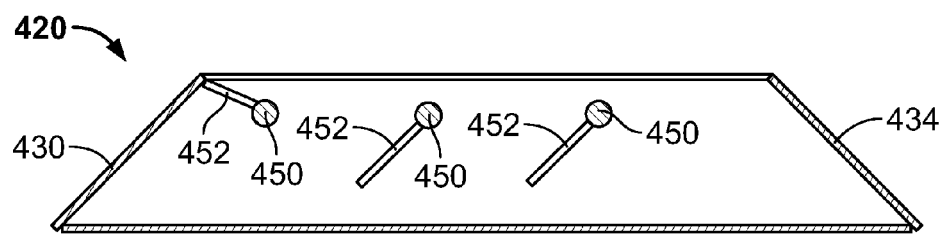
FIG. 16 is a cross-sectional view of the exemplary pavement cleat in FIG. 11 taken along lines 16-16 in FIG. 15.
Figure 17:
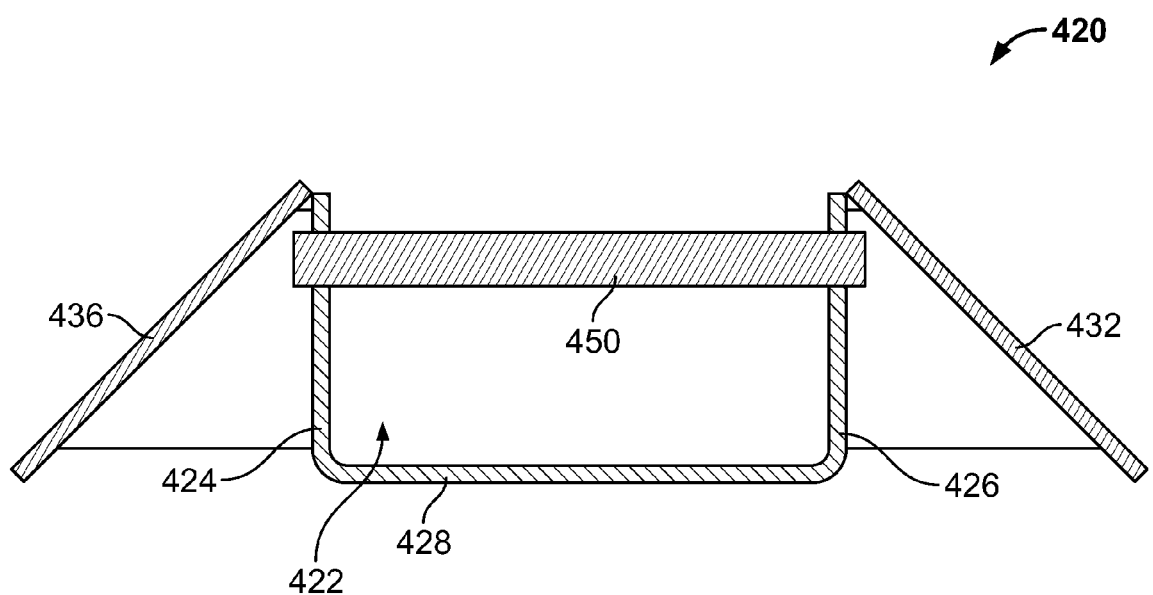
FIG. 17 is a cross-sectional view of the exemplary pavement cleat in FIG. 11 taken along lines 17-17 in FIG. 15.

Referring to FIGS. 15-17, the exemplary cleat 420 comprises an open top with a longitudinal block U-shaped tunnel 422 having opposed vertical sidewalls 424, 426 and a bottom wall 428. Trapezoidal plates 430, 432, 434, 436 are mounted to tapered ends and to the top of the vertical sidewalls 424, 426. In addition, the trapezoidal plates 430, 432, 434, 436 are mounted to each other at their angled ends. In this manner, the trapezoidal plates 430, 432, 434, 436 operate to provide an angled incline so that unintended objects contacting the cleat 420 can pass thereover.

On the interior of the cleat 420 are a series of spaced apart dowel pins 450 that span laterally across the vertical sidewalls 424, 426. Each dowel pin 450 includes a flange 452 that extends perpendicularly from the circumference and extends substantially the entire distance between the vertical sidewalls 422, 426 of the tunnel 422. The vertical sidewalls 422, 426 422 include corresponding openings in order to receive the dowel pins 450. But it should be noted that in this exemplary cleat 420, the dowel pins 450 are not rotationally repositionable with respect to the vertical sidewalls 422, 426. However, it is within the scope of the disclosure to provide dowel pins 450 and flanges 452 that are rotationally repositionable. Specifically, the flanges 452 may be spring biased and operative to close the gap between adjacent pins 450 in order to prohibit unintended objects from entering the interior of the cleat 420.

In exemplary form, the forward most dowel pin 450 is mounted to the vertical sidewalls 424, 426 so that its flange 452 extends to meet the top edge of the forward trapezoidal plate 430. As will be discussed in more detail below, this orientation ensures that the hook 406 does not inadvertently snag the top edge of the forward trapezoidal plate 430. The remaining dowel pins 450 are oriented so that the flanges 452 are upwardly sloped from front to back.

The orientation for the flanges 452 of the second and successive dowel pins 450 provides a series of ramps that allow the hook 406 to move from front to back across the dowel pins without becoming snagged. Simply put, the hook 406, when moving from front to back, slides up the flange and over one of the dowel pins, to only drop down and contact a successive flange of a successive dowel pin. The same process may be repeated until the hook reaches the top of last dowel pin or the hook is moved forward. At this point, the hook 406 slides over the last dowel pin and begins to slide down the face of the rear trapezoidal plate 434. In contrast, when the hook 406 is repositioned from rear to front, the cavity 412 of the hook receives whichever dowel pin 450 is nearest in order to retain the hook within the cleat 420. This retention occurs because the angled surfaces provided by the flanges 452 operate to direct the hook 406 into contact with the nearest dowel pin 450 so that the dowel pin is received within the cavity. In this received position, the draw bar and associated hook 380 cannot be moved forward to the next nearest dowel pin, nor can the hook 406 be vertically repositioned out of engagement with the dowel pin. In order to discontinue engagement of the hook 406 with the instant dowel pin 450, the draw bar and associated hook 380 is repositioned rearward (from front to back) until the tip of the hook 406 clears the instant dowel pin. Thereafter, the draw bar and associated hook 380 may be vertically raised to remove the hook 406 from within the cleat 420.

Referring back to FIGS. 11 and 12, in order to vertically reposition the draw bar and associated hook 380, a pneumatic cylinder 460 is concurrently coupled to the rectangular tubing 382 and corresponding brackets 462 mounted at the rear of the frame 312. In this exemplary embodiment, air supply lines (not shown) are coupled to the pneumatic cylinder 460 and are adapted to receive air from a yard truck or other tractor (see e.g., FIGS. 8 and 9). The pneumatic cylinder 460 is pivotally mounted to the rear of the frame 312 by way of the corresponding brackets 462, while the pneumatic cylinder piston 466 is repositionably mounted to a clevis 468 on the rectangular tubing 382 using a through pin (not shown). The clevis 468 is formed by two parallel metal plates that are welded to the rectangular tubing, where each plate has an aligned hole that receives the through pin. In this manner, when the piston 466 is extended from the cylinder 460, the draw bar and associated hook 380 are pivoted about the axle 402 in order to lower the hook 406. Conversely, when the piston 466 is retracted into the cylinder 460, the draw bar and associated hook 380 are pivoted about the axle 402 in order to raise the hook 406.

In addition, the exemplary trailer support 310 may include a pair of repositionable wheel chocks 480 having generally the same structure and mode of operation as the wheel chocks 50 discussed with respect to the foregoing embodiment. Accordingly, for purposes of brevity, a detailed discussion of the components and mode of operation has been omitted.

In operation, a yard truck (not shown) attaches itself to the trailer support 310 by way of the yard truck's tow hook being coupled to the hitch 336 of the trailer support. In addition to attaching the yard truck to the trailer support 310 using the hitch 336, the yard truck operator also connects quick connects of the trailer stabilizer 310 to quick connects associated with the yard truck to supply electrical and pneumatic power to the trailer stabilizer. It should also be noted that the yard truck may include hydraulic pump(s), lines, and connections (not shown) that connect to connections, lines, and devices of the trailer support 310, such as when the draw bar and associated hook 380 is hydraulically repositioned by way of a hydraulic cylinder instead of a pneumatic cylinder 460.

After completing connections between the yard truck and the trailer support 310, the yard truck operator then drives the yard truck into position with respect to a trailer having already been parked at a loading dock so that the doors of the trailer are open and the associated opening at the rear of the trailer is adjacent a loading dock opening. The yard truck operator then begins to back the trailer stabilizer 310 underneath the trailer, with the rear of the stabilizer where the draw bar and associated hook 380 is located moving underneath the trailer first so that the fifth wheel 340 is aligned with the kingpin of the trailer. While the trailer stabilizer 310 is backed underneath the trailer, the repositionable wheel chocks 480 are in a storage position, the brake assemblies of the trailer stabilizer are free (i.e., not locked), and the draw bar and associated hook 380 are in a raised position. Continued backing of the yard truck causes the trailer stabilizer 310 to be further repositioned underneath the trailer, eventually so much so that the kingpin engages the fifth wheel 340 and becomes locked within the fifth wheel, thereby coupling the trailer stabilizer to the trailer. At this time, a kingpin sensor detects the position of the kingpin with respect to the fifth wheel 340 and communicates a signal indicative of the kingpin position to a controller associated with the yard truck. Thereafter, the controller wirelessly communicates a signal to a visual display (not shown), which displays visual indicia within a warehouse to dock workers telling them that the kingpin is secured to the trailer stabilizer 310.

After the trailer stabilizer 310 is coupled to the trailer, a number of events occur to lock the position of the trailer stabilizer with respect to the trailer. First, the yard truck operator lowers the draw bar and associated hook 380 so that the hook 406 contacts the top of the cleat 420, which is already securely mounted to the pavement/concrete underneath the trailer, in order for the hook to float on top of the cleat. The yard truck operator then pulls slightly forward so that the hook 406 captures one of the dowel pins 450 within the cavity 422 and retards further forward movement of the stabilizer 310. A sensor associated with the stabilizer 310 detects the deployed position of the draw bar and associated hook 380 and communicates this to the controller. The controller then wirelessly communicates a signal to a visual display (not shown) or powers an infrared light source to communicate with an infrared light detector operatively coupled to the visual display letting dock workers know that the draw bar and associated hook 380 is deployed.

In addition to securing the hook 406 to the cleat 420, the yard truck operator also locks the braking assembly of the trailer stabilizer by depressurizing the pneumatic lines feeding the drum assemblies. This depressurization causes the brake pads to be forced against the brake drum/disc, thereby retarding rotational motion of the wheels 316. Another event is the deployment of the repositionable wheel chocks 480 using a pneumatic cylinder 482. Deployment of the wheel chocks 480 is essentially the same as that discussed for the first exemplary embodiment and has been omitted only to further brevity. Thereafter, the yard truck unhooks any pneumatic and electrical connections with the trailer stabilizer and continues on to the next spotted trailer.

After the trailer is fully loaded or unloaded, the yard truck reattaches itself to the trailer support 310, which includes reattaching any pneumatic and electrical connections. After these connections have been reestablished, the repositionable wheel chocks 480 are raised to a storage position and the brake assemblies are freed (i.e., not locked). This allows the yard truck operator to slightly reposition the trailer support 310 toward the rear of the trailer to unseat the hook 406 from the nearest dowel pin 450 of the cleat 420. After the hook 406 is unseated, the yard truck operator manipulates valves to supply air to the air supply lines coupled to the pneumatic cylinder 460. This, in turn, causes the piston 466 to retract within the cylinder 460, thereby pivoting the draw bar and associated hook 380 about the axle 402, thus raising the hook 406. After the hook 406 has been raised to no longer potentially come in contact with the cleat 420, and the landing gear of the trailer has been lowered, the yard truck pulls the trailer support 310 out from under the trailer so that the kingpin of the trailer no longer engages the fifth wheel 340.

The exemplary trailer stabilizer 310 is operative to inhibit trailer nosedives, tip-overs, and trailer creep. Moreover, the exemplary trailer stabilizer 310 includes a means for informing dock personnel when the trailer stabilizer 310 is mounted to the trailer, thereby informing the dock personnel that it is safe or unsafe to load/unload the trailer, similar to that discussed for the first exemplary embodiment.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A trailer stabilizing device comprising a frame operatively coupled to wheels, a kingpin receiver operatively coupled to the frame, a repositionable tailhook operatively coupled to the frame, a hitch operatively coupled to the frame and utilized for portably repositioning the trailer stabilizing device, and an on-board controller configured to receive a signal from a sensor that at least one of a kingpin is received by the kingpin receiver and the repositionable tailhook engages a ground cleat, wherein the repositionable tailhook extends in a proximal direction, and the hitch extends in a distal direction, generally opposing the proximal direction, and wherein the on-board controller includes a wireless transmitter configured to transmit a signal to a receiver indicating at least one of the kingpin is received by the kingpin receiver and the repositionable tailhook engages the ground cleat.

2. The trailer stabilizing device of claim 1, wherein the tailhook is repositionable with respect to the frame between a disengaged ground position and an engaged ground position.

3. The trailer stabilizing device of claim 2, wherein the frame is operatively coupled to at least one of a hydraulic cylinder and a pneumatic cylinder operatively coupled to the tailhook, at least one of the hydraulic cylinder and the pneumatic cylinder configured to reposition the tailhook between the ground engaged position and the ground disengaged position.

4. The trailer stabilizing device of claim 2, wherein the on-board controller is configured to receive the signal from the sensor that the tailhook is in at least one of the ground engaged position and the ground disengaged position, wherein the wireless transmitter is configured to transmit the signal to the receiver indicating the tailhook is in at least one of the ground engaged position and the ground disengaged position.

5. The trailer stabilizing device of claim 4, further comprising an electrical umbilical cord in electrical communication with the on-board controller, the electrical umbilical cord configured to establish electrical communication between a remote power source and the on-board controller.

6. The trailer stabilizing device of claim 2, wherein the frame is operatively coupled to at least one of a hydraulic repositioner and a pneumatic repositioner operatively coupled to the tailhook, at least one of the hydraulic repositioner and the pneumatic repositioner configured to reposition the tailhook between the ground engaged position and the ground disengaged position.

7. The trailer stabilizing device of claim 1, further comprising an on-board power source operatively coupled to the frame, the on-board power source providing power to reposition the tailhook among a ground engaged position and a ground disengaged position.

8. The trailer stabilizing device of claim 7, wherein the on-board power source comprises at least one of a battery and a generator.

9. The trailer stabilizing device of claim 1, wherein the kingpin receiver includes a fifth wheel.

10. The trailer stabilizing device of claim 1, wherein the repositionable tailhook comprises a winch and cable.

11. The trailer stabilizing device of claim 1, wherein the receiver is communicatively coupled to a visual display providing visual indicia that changes depending upon whether at least one of the kingpin is received by the kingpin receiver and the repositionable tailhook engages the ground cleat.

12. The trailer stabilizing device of claim 11, wherein:
the receiver is communicatively coupled to an infrared transmitter; and,
the visual display is communicatively coupled to an infrared receiver.

13. The trailer stabilizing device of claim 1, further comprising an electrical umbilical cord in electrical communication with the on-board controller, the electrical umbilical cord configured to establish electrical communication between a remote power source and the on-board controller.

14. A trailer stabilizing device comprising a frame operatively coupled to wheels, a kingpin receiver, a tailhook repositionable with respect to the frame between a disengaged ground position and an engaged ground position, and an on-board controller configured to receive a signal from a sensor that the tailhook is in at least one of the ground engaged position and the ground disengaged position, wherein the on-board controller includes a wireless transmitter configured to transmit a signal to a receiver indicating the tailhook is in at least one of the ground engaged position and the ground disengaged position.

15. The trailer stabilizing device of claim 14, further comprising an electrical umbilical cord in electrical communication with the on-board controller, the electrical umbilical cord configured to establish electrical communication between a remote power source and the on-board controller.

16. The trailer stabilizing device of claim 14, wherein the frame is operatively coupled to at least one of a hydraulic repositioner and a pneumatic repositioner operatively coupled to the tailhook, at least one of the hydraulic repositioner and the pneumatic repositioner configured to reposition the tailhook between the ground engaged position and the ground disengaged position.

17. The trailer stabilizing device of claim 14, wherein the receiver is communicatively coupled to a visual display providing visual indicia that changes depending upon whether at least one of a kingpin of a parked trailer is received by the kingpin receiver and the repositionable tailhook engages the ground cleat.

18. The trailer stabilizing device of claim 14, wherein the kingpin receiver includes a fifth wheel.

19. A trailer stabilizing device comprising a frame operatively coupled to wheels, a kingpin receiver, a tailhook repositionable with respect to the frame between a disengaged ground position and an engaged ground position, and an on-board controller configured to receive a signal from a sensor that at least one of a kingpin is received by the kingpin receiver and the repositionable tailhook engages a ground cleat, wherein the on-board controller includes a wireless transmitter configured to transmit a signal to a receiver indicating at least one of the kingpin is received by the kingpin receiver and the repositionable tailhook engages the ground cleat.

20. The trailer stabilizing device of claim 19, wherein the receiver is communicatively coupled to a visual display providing visual indicia that changes depending upon whether at least one of the kingpin is received by the kingpin receiver and the repositionable tailhook engages the ground cleat.

21. The trailer stabilizing device of claim 20, wherein:
the receiver is communicatively coupled to an infrared transmitter; and,
the visual display is communicatively coupled to an infrared receiver.

22. The trailer stabilizing device of claim 19, wherein the kingpin receiver includes a fifth wheel.

23. The trailer stabilizing device of claim 19, further comprising an electrical umbilical cord in electrical communication with the on-board controller, the electrical umbilical cord configured to establish electrical communication between a remote power source and the on-board controller.

24. A trailer stabilizing device comprising a frame operatively coupled to wheels, a kingpin receiver operatively coupled to the frame, a repositionable tailhook operatively coupled to the frame, a hitch operatively coupled to the frame and utilized for portably repositioning the trailer stabilizing device, wherein the repositionable tailhook extends in a proximal direction and is repositionable with respect to the frame between a disengaged ground position and an engaged ground position, and the hitch extends in a distal direction, generally opposing the proximal direction, and an on-board controller configured to receive a signal from a sensor that the tailhook is in at least one of the ground engaged position and the ground disengaged position, wherein the on-board controller includes a wireless transmitter configured to transmit a signal to a receiver indicating the tailhook is in at least one of the ground engaged position and the ground disengaged position.

25. The trailer stabilizing device of claim 24, further comprising an on-board power source operatively coupled to the frame, the on-board power source providing power to reposition the tailhook among the ground engaged position and the ground disengaged position.

26. The trailer stabilizing device of claim 25, wherein the on-board power source comprises at least one of a battery and a generator.

27. The trailer stabilizing device of claim 24, wherein the kingpin receiver includes a fifth wheel.

28. The trailer stabilizing device of claim 24, wherein the frame is operatively coupled to at least one of a hydraulic cylinder and a pneumatic cylinder operatively coupled to the tailhook, at least one of the hydraulic cylinder and the pneumatic cylinder configured to reposition the tailhook between the ground engaged position and the ground disengaged position.

29. The trailer stabilizing device of claim 24, further comprising an electrical umbilical cord in electrical communication with the on-board controller, the electrical umbilical cord configured to establish electrical communication between a remote power source and the on-board controller.

30. The trailer stabilizing device of claim 24, wherein the repositionable tailhook comprises a winch and cable.

31. The trailer stabilizing device of claim 24, wherein the frame is operatively coupled to at least one of a hydraulic repositioner and a pneumatic repositioner operatively coupled to the tailhook, at least one of the hydraulic repositioner and the pneumatic repositioner configured to reposition the tailhook between the ground engaged position and the ground disengaged position.

32. The trailer stabilizing device of claim 24, wherein the on-board controller is configured to receive a signal from a sensor that a kingpin is received by the kingpin receiver.

33. The trailer stabilizing device of claim 32, wherein the wireless transmitter is configured to transmit a signal to the receiver indicating the kingpin is received by the kingpin receiver.

34. The trailer stabilizing device of claim 33, wherein the receiver is communicatively coupled to a visual display providing visual indicia that changes depending upon whether at least one of the kingpin is received by the kingpin receiver and the repositionable tailhook engages a ground cleat.

35. The trailer stabilizing device of claim 34, wherein:
the receiver is communicatively coupled to an infrared transmitter; and,
the visual display is communicatively coupled to an infrared receiver.

36. The trailer stabilizing device of claim 24, wherein the receiver is communicatively coupled to a visual display providing visual indicia that changes depending upon whether the repositionable tailhook engages a ground cleat.

* * * * *